(12) United States Patent
Da et al.

(10) Patent No.: US 11,921,226 B2
(45) Date of Patent: Mar. 5, 2024

(54) POSITIONING METHOD AND DEVICE

(71) Applicant: DATANG MOBILE COMMUNICATIONS EQUIPMENT CO., LTD., Beijing (CN)

(72) Inventors: Ren Da, Beijing (CN); Bin Ren, Beijing (CN); Deshan Miao, Beijing (CN); Hui Li, Beijing (CN); Xueyuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 322 days.

(21) Appl. No.: 17/415,678

(22) PCT Filed: Nov. 21, 2019

(86) PCT No.: PCT/CN2019/119902
§ 371 (c)(1),
(2) Date: Jun. 17, 2021

(87) PCT Pub. No.: WO2020/125310
PCT Pub. Date: Jun. 25, 2020

(65) Prior Publication Data
US 2022/0043099 A1 Feb. 10, 2022

(30) Foreign Application Priority Data
Dec. 19, 2018 (CN) .......................... 201811558107.2

(51) Int. Cl.
*G01S 5/02* (2010.01)
*G01S 5/00* (2006.01)
(Continued)

(52) U.S. Cl.
CPC ............ *G01S 5/0284* (2013.01); *G01S 5/018* (2020.05); *H04W 4/023* (2013.01); *H04W 4/024* (2018.02)

(58) Field of Classification Search
None
See application file for complete search history.

(56) References Cited

U.S. PATENT DOCUMENTS

| 11,353,542 B2 * | 6/2022 | Da ........................ G01S 5/0268 |
| 2004/0140930 A1 | 7/2004 | Harles |
| 2012/0165053 A1 | 6/2012 | Yoon et al. |
| 2015/0198696 A1 | 7/2015 | Liu |

(Continued)

FOREIGN PATENT DOCUMENTS

| CN | 103179662 A | 6/2013 |
| CN | 103458446 A | 12/2013 |

(Continued)

OTHER PUBLICATIONS

First Office Action for Chinese patent application 201811558107.2, dated Dec. 3, 2020, all pages.
(Continued)

*Primary Examiner* — Adolf Dsouza
(74) *Attorney, Agent, or Firm* — Ladas & Parry, LLP

(57) ABSTRACT

A method and a device for positioning are provided. The method for positioning includes: measuring, by a first vehicle, a positioning reference signal PRS and a carrier phase reference signal C-PRS sent by a plurality of positioning reference devices, to obtain a plurality of PRS measurement results and a plurality of C-PRS measurement results, the plurality of positioning reference devices including a network side device and other vehicles; performing, by the first vehicle, a positioning operation according to the plurality of PRS measurement results and the plurality of C-PRS measurement results.

20 Claims, 9 Drawing Sheets

(51) Int. Cl.
  *H04W 4/02* (2018.01)
  *H04W 4/024* (2018.01)

(56) References Cited

U.S. PATENT DOCUMENTS

| | | |
|---|---|---|
| 2015/0219750 A1 | 8/2015 | Xiao et al. |
| 2016/0095080 A1 | 3/2016 | Khoryaev et al. |
| 2017/0070873 A1 | 3/2017 | Pon et al. |
| 2018/0159641 A1 | 6/2018 | Xu et al. |
| 2018/0317111 A1* | 11/2018 | Agnihotri ............ G01S 5/0252 |
| 2021/0006372 A1* | 1/2021 | Cha ........................ H04L 1/08 |

FOREIGN PATENT DOCUMENTS

| | | |
|---|---|---|
| CN | 104302003 A | 1/2015 |
| CN | 104881951 A | 9/2015 |
| CN | 106143538 B | 8/2017 |
| JP | 2004534212 A | 11/2004 |
| JP | 2017527806 A | 9/2017 |
| JP | 2018515023 A | 6/2018 |
| JP | 2018530750 A | 10/2018 |
| WO | 2018029663 A1 | 2/2018 |

OTHER PUBLICATIONS

3GPP TSG RAN WG1 Meeting #95 R1-1812615 Spokane, USA, Nov. 12-16, 2018, Source: CATT Title: "Discussion of Potential Techniques for NR Positioning", all pages.

3GPP TSG-RAN WG2 Meeting #104 R2-1817902 Spokane, USA, Nov. 12-16, 2018, Source: Qualcomm Incorporated Title: "On Demand Transmission of PRS for NR", all pages.

Office Action for Japanese Patent Application 2021-536011 issued by the Japanese Patent Office dated Apr. 5, 2023, and Its English Translation provided by Global Dossier.

Extended European Search Report from EP app. No. 19900568.7, dated Jan. 17, 2022, all pages.

"3rd Generation Partnership Project; Technical Specification Group Radio Access Network; NG Radio Access Network (NG-RAN); Stage 2 functional specification of User Equipment (UE) positioning in NG-RAN (Release 15)", 3GPP TS 38.305 V15.1.0, Sep. 2018, all pages.

First Office Action for Japanese Patent Application 2021-536011 issued by the Japanese Patent Office dated Jun. 7, 2022, and Its English Translation provided by Global Dossier.

\* cited by examiner

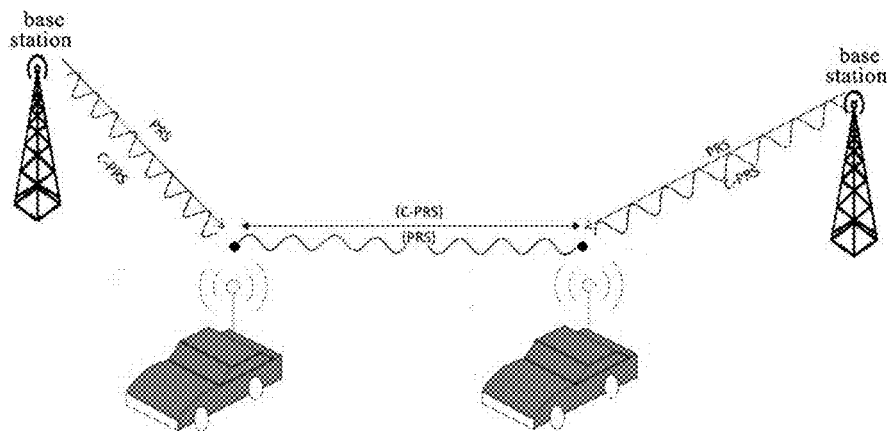

FIG. 5

```
measuring, by a first vehicle, a positioning reference signal PRS and a      ┌─ 601
carrier phase reference signal C-PRS sent by a plurality of positioning
reference devices to obtain a plurality of PRS measurement results and a
             plurality of C-PRS measurement results
                              │
                              ▼
performing, by the first vehicle, a positioning operation according to the   ┌─ 602
    plurality of PRS measurement results and the plurality of C-PRS
                         measurement results
```

FIG. 6

```
                                                                             ┌─ 701
sending, by a network side device, PRS and the C-PRS to a
first vehicle, so that the first vehicle measures the PRS to
obtain the PRS measurement result, and measures the C-PRS
         to obtain the C-PRS measurement result
```

FIG. 7

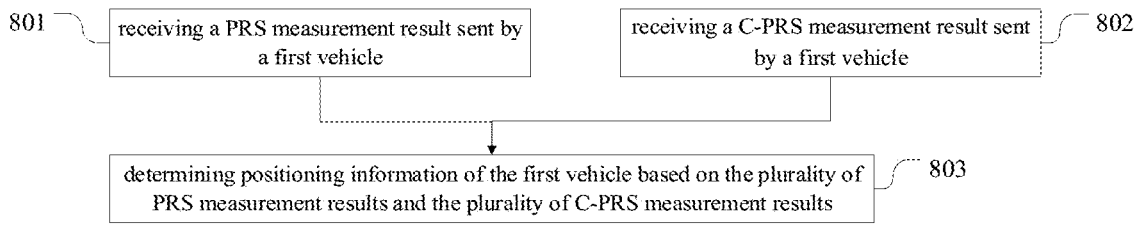

FIG. 8

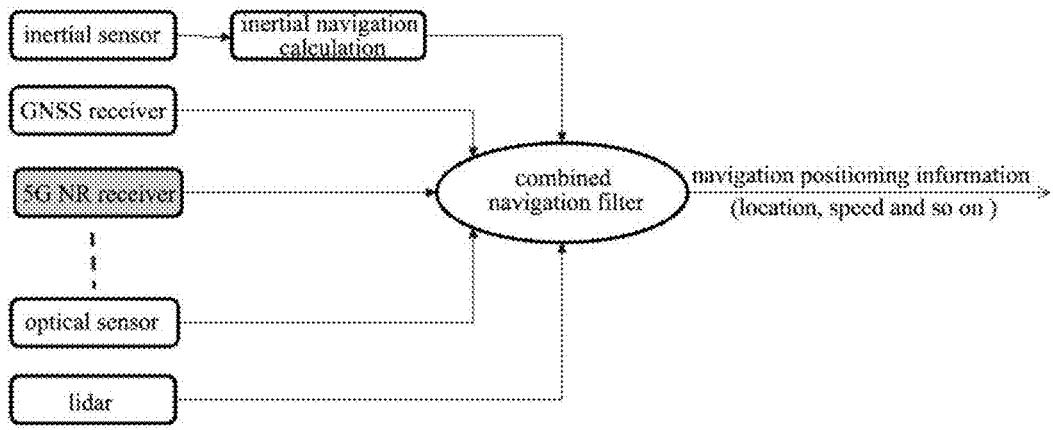

FIG. 9

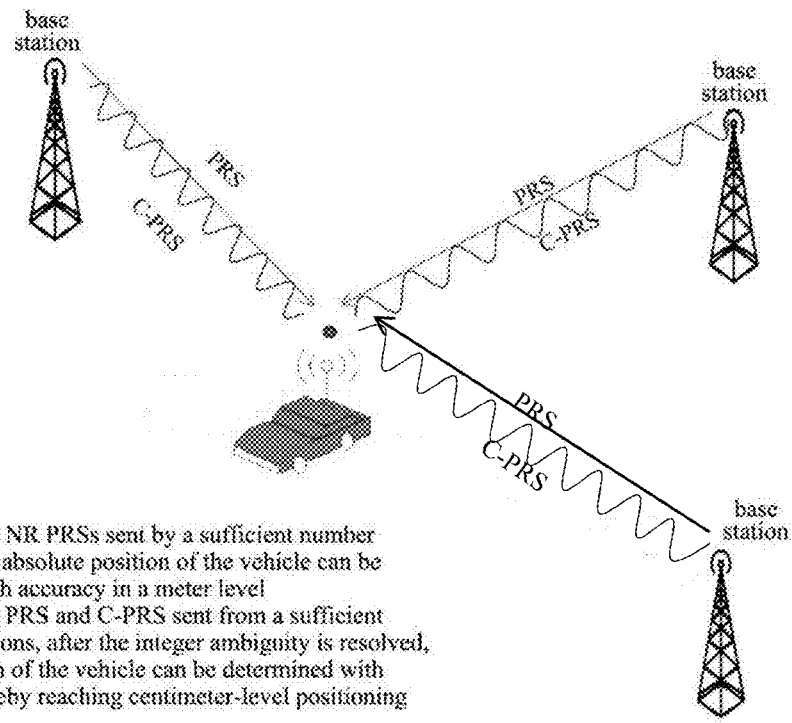

- If a vehicle receives NR PRSs sent by a sufficient number of base stations, the absolute position of the vehicle can be determined with high accuracy in a meter level
- If a vehicle receives PRS and C-PRS sent from a sufficient number of base stations, after the integer ambiguity is resolved, the absolute position of the vehicle can be determined with ultra-precision, thereby reaching centimeter-level positioning accuracy.

FIG. 10

POSITIONING METHOD AND DEVICE

CROSS-REFERENCE TO RELATED APPLICATIONS

This application is the U.S. national phase of PCT Application No. PCT/CN2019/119902 filed on Nov. 21, 2019, which claims a priority of the Chinese patent application No. 201811558107.2 filed on Dec. 19, 2018, the disclosures of which are incorporated herein by reference in their entireties.

TECHNICAL FIELD

The present disclosure relates to the field of communication technology, in particular to a positioning method and device.

BACKGROUND

In a related art, navigation and positioning of vehicle are mainly based on the Global Navigation Satellite System (GNSS). The general positioning accuracy of GNSS is about a few meters, which cannot meet the accuracy requirements for the navigation and positioning system of the new radio (NR) Internet of Vehicles (IoV) system of the fifth generation mobile communication technology (5G), such as the automatic driving function of the vehicle. The GNSS navigation and positioning system using real-time dynamic difference technology can greatly improve the positioning accuracy of the vehicle navigation and positioning system, and it is possible to reduce the positioning error to the level of decimeters or even centimeters. However, there are two important problems in this system. First, GNSS cannot work normally in many cases. For example, in an urban environment, GNSS may not work normally because the GNSS signal is blocked by buildings. Since users can neither increase the number of navigation satellites according to environmental needs, nor adjust the transmission frequency of satellite signals or increase the transmission power of satellite signals according to environmental needs, this inherent problem of GNSS cannot be solved by GNSS itself. Second, the GNSS navigation and positioning system using the real-time dynamic differential technology need to obtain the differential correction information from a differential server. The delay of the differential correction information generally takes a few seconds or even longer. Therefore, it is difficult to only rely on GNSS to meet the requirements of the future 5G car networking system on the positioning accuracy, availability, reliability, and positioning time delay of the navigation and positioning system.

In order to make up for the inherent defect of GNSS, a possible method is to combine GNSS with other vehicle navigation sensors, such as an inertial measurement unit (IMU), a lidar, and an optical sensor, as shown in FIG. 1. However, vehicle navigation and positioning system generally can only maintain a certain positioning accuracy within a short time period after losing the GNSS signal.

The existing vehicle integrated navigation and positioning system as shown in FIG. 1 has the following defects. When the GNSS cannot work normally due to signal problems, the GNSS-based vehicle integrated navigation and positioning system can only maintain a certain accuracy in a short time period, but cannot maintain high accuracy in a long time period. In addition, various vehicle integrated navigation sensors have their own limitations. For example, weather conditions (such as fog, snow, and rain) have a significant impact on the measurement of the lidar and the optical sensors. IMUs with good performance can maintain the navigation accuracy for a longer time period after losing the GNSS signal, but it is expensive, and a low-cost IMU has a larger measurement error, and the low-cost IMU can only maintain the navigation accuracy for a short time period after losing the GNSS signal. Therefore, the vehicle navigation and positioning system in the related art cannot meet the requirements of the future Internet of Vehicles system for the navigation and positioning system of high precision, high availability, high reliability, low delay and low cost.

SUMMARY

The present disclosure provides a vehicle positioning method and related device, so as to provide an accurate and reliable location information to the IoV system.

An embodiment of the present disclosure provides a positioning method, includes: measuring, by a first vehicle, a positioning reference signal PRS and a carrier phase reference signal C-PRS sent by a plurality of positioning reference devices, to obtain a plurality of PRS measurement results and a plurality of C-PRS measurement results, the plurality of positioning reference devices including a network side device and other vehicles; performing, by the first vehicle, a positioning operation according to the plurality of PRS measurement results and the plurality of C-PRS measurement results; wherein the positioning operation includes: sending the plurality of PRS measurement results and the plurality of C-PRS measurement results to a location server, and receiving location information of the first vehicle determined based on the plurality of PRS measurement results and the plurality of C-PRS measurement results from the location server; or the positioning operation includes: determining, by the first vehicle, the location information of the first vehicle according to the plurality of PRS measurement results and the plurality of C-PRS measurement results; the location information of the first vehicle includes at least one of the following information: a location of the first vehicle, a relative distance between the first vehicle and the other vehicles, change information of the relative distance between the first vehicle and the other vehicles, a relative location of the first vehicle with respect to the other vehicles, and change information of the relative location of the first vehicle with respect to the other vehicles.

An embodiment of the present disclosure provides another positioning method, includes: sending, by a network side device, a positioning reference signal PRS and a carrier phase reference signal C-PRS to a first vehicle, so that the first vehicle measures the PRS to obtain a PRS measurement result, and measures the C-PRS to obtain a C-PRS measurement result; wherein the PRS measurement result and the C-PRS measurement result are used for location information of the first vehicle, and the location information of the first vehicle includes at least one of the following information: a location of the first vehicle, a relative distance between the first vehicle and other vehicles, change information of the relative distance between the first vehicle and the other vehicles, a relative location of the first vehicle with respect to the other vehicles, and change information of the relative location of the first vehicle with respect to the other vehicles.

An embodiment of the present disclosure provides yet another positioning method, includes: receiving, by a location server, a positioning reference signal PRS measurement result of a PRS sent by a first vehicle to a plurality of positioning reference devices, wherein the plurality of positioning reference devices include a network side device and other vehicles; receiving, by the location server, a carrier phase reference signal C-PRS measurement result of a C-PRS sent by the first vehicle to the plurality of positioning reference devices; determining, by the location server, location information of the first vehicle according to the plurality of PRS measurement results and the plurality of C-PRS measurement results; wherein the location information of the first vehicle includes at least one of the following information: a location of the first vehicle, a relative distance between the first vehicle and the other vehicles, change information of the relative distance between the first vehicle and the other vehicles, a relative location of the first vehicle with respect to the other vehicles, and change information of the relative location of the first vehicle with respect to the other vehicles.

An embodiment of the present disclosure provides a first vehicle, comprising: a transceiver, a memory, a processor, and a computer program stored on the memory and executed by the processor; the transceiver is configured to measure a positioning reference signal PRS and a carrier phase reference signal C-PRS sent by a plurality of positioning reference devices, to obtain a plurality of PRS measurement results and a plurality of C-PRS measurement results, the plurality of positioning reference devices including a network side device and other vehicles; the processor is configured to read a program in a memory, and execute the following process: performing a positioning operation according to the plurality of PRS measurement results and the plurality of C-PRS measurement results; wherein the positioning operation includes: sending the plurality of PRS measurement results and the plurality of C-PRS measurement results to a location server, and receiving location information of the first vehicle determined based on the plurality of PRS measurement results and the plurality of C-PRS measurement results from the location server; or the positioning operation includes: determining, by the first vehicle, the location information of the first vehicle according to the plurality of PRS measurement results and the plurality of C-PRS measurement results; the location information of the first vehicle includes at least one of the following information: a location of the first vehicle, a relative distance between the first vehicle and the other vehicles, change information of the relative distance between the first vehicle and the other vehicles, a relative location of the first vehicle with respect to the other vehicles, and change information of the relative location of the first vehicle with respect to the other vehicles.

An embodiment of the present disclosure provides a network side device, includes: a transceiver, a memory, a processor, and a computer program stored on the memory and executed by the processor; the transceiver is configured to send a positioning reference signal PRS and a carrier phase reference signal C-PRS to a first vehicle, so that the first vehicle measures the PRS to obtain a PRS measurement result, and measures the C-PRS to obtain a C-PRS measurement result; wherein the PRS measurement result and the C-PRS measurement result are used for location information of the first vehicle, and the location information of the first vehicle includes at least one of the following information: a location of the first vehicle, a relative distance between the first vehicle and other vehicles, change information of the relative distance between the first vehicle and the other vehicles, a relative location of the first vehicle with respect to the other vehicles, and change information of the relative location of the first vehicle with respect to the other vehicles.

An embodiment of the present disclosure provides a location server, includes: a transceiver, a memory, a processor, and a computer program stored on the memory and executed by the processor; the transceiver is configured to receive a positioning reference signal PRS measurement result of a PRS sent by a first vehicle to a plurality of positioning reference devices, wherein the plurality of positioning reference devices include a network side device and other vehicles; and, receiving a carrier phase reference signal C-PRS measurement result of a C-PRS sent by the first vehicle to the plurality of positioning reference devices; the processor is configured to read a program in a memory and execute the following process: determining location information of the first vehicle according to the plurality of PRS measurement results and the plurality of C-PRS measurement results; wherein the location information of the first vehicle includes at least one of the following information: a location of the first vehicle, a relative distance between the first vehicle and the other vehicles, change information of the relative distance between the first vehicle and the other vehicles, a relative location of the first vehicle with respect to the other vehicles, and change information of the relative location of the first vehicle with respect to the other vehicles.

An embodiment of the present disclosure provides a first vehicle, includes: a measuring unit, configured to measure a positioning reference signal PRS and a carrier phase reference signal C-PRS sent by a plurality of positioning reference devices, to obtain a plurality of PRS measurement results and a plurality of C-PRS measurement results, the plurality of positioning reference devices including a network side device and other vehicles; a positioning operation unit, configured to perform a positioning operation according to the plurality of PRS measurement results and the plurality of C-PRS measurement results; wherein the positioning operation includes: sending the plurality of PRS measurement results and the plurality of C-PRS measurement results to a location server, and receiving location information of the first vehicle determined based on the plurality of PRS measurement results and the plurality of C-PRS measurement results from the location server; or the positioning operation includes: determining, by the first vehicle, the location information of the first vehicle according to the plurality of PRS measurement results and the plurality of C-PRS measurement results; the location information of the first vehicle includes at least one of the following information: a location of the first vehicle, a relative distance between the first vehicle and the other vehicles, change information of the relative distance between the first vehicle and the other vehicles, a relative location of the first vehicle with respect to the other vehicles, and change information of the relative location of the first vehicle with respect to the other vehicles.

An embodiment of the present disclosure provides a network side device, includes: a transceiving unit, configured to send a positioning reference signal PRS and a carrier phase reference signal C-PRS to a first vehicle, so that the first vehicle measures the PRS to obtain a PRS measurement result, and measures the C-PRS to obtain a C-PRS measurement result; wherein the PRS measurement result and the C-PRS measurement result are used for location information of the first vehicle, and the location information of the first vehicle includes at least one of the following information: a location of the first vehicle, a relative distance between the first vehicle and other vehicles, change information of the relative distance between the first vehicle and the other vehicles, a relative location of the first vehicle with respect to the other vehicles, and change information of the relative location of the first vehicle with respect to the other vehicles.

An embodiment of the present disclosure provides a location server, includes: a transceiving unit, configured to receive a positioning reference signal PRS measurement result of a PRS sent by a first vehicle to a plurality of positioning reference devices, wherein the plurality of positioning reference devices include a network side device and other vehicles; and, receiving a carrier phase reference signal C-PRS measurement result of a C-PRS sent by the first vehicle to the plurality of positioning reference devices; and a positioning unit, configured to determine location information of the first vehicle according to the plurality of PRS measurement results and the plurality of C-PRS measurement results; wherein the location information of the first vehicle includes at least one of the following information: a location of the first vehicle, a relative distance between the first vehicle and the other vehicles, change information of the relative distance between the first vehicle and the other vehicles, a relative location of the first vehicle with respect to the other vehicles, and change information of the relative location of the first vehicle with respect to the other vehicles.

An embodiment of the present disclosure also provides a computer-readable storage medium on which a computer program is stored, and when the computer program is executed by a processor, the steps of the above-mentioned positioning method are realized.

The beneficial effects of the above technical solutions of the present disclosure are as follows.
a) Vehicle positioning is performed through the PRS and C-PRS sent by the 5G NR system itself, which can work when the GNSS satellite signal is weak or cannot be received. Operators can also adjust and configure the number, position, and transmitting frequency of the sending end that send PRS and C-PRS signals as needed to avoid problems similar to that GNSS cannot work due to weak received signals;
b) Operators can reduce measurement errors of TOA/TDOA by adjusting the configuration of sending PRS according to their needs, making it easier to search for integer ambiguity in carrier phase measurements;
c) In a normal working environment, the signal power at the receiving end of 5G NR is much greater than the signal power of the GNSS signal reaching the ground. Compared with GNSS, it is easier and faster to lock the 5G NR carrier signal; and if losing phase lock occurs, the phase lock can be restored quickly;
d) Utilizing the large bandwidth and high data rate of the 5G NR wireless communication system, the time used for location information communication and positioning measurement can be reduced to a few milliseconds or less.

BRIEF DESCRIPTION OF THE DRAWINGS

FIG. 5 is a schematic diagram of another scenario application of an embodiment of the present disclosure;

FIG. 6 is a schematic diagram of a positioning method according to an embodiment of the present disclosure;

FIG. 7 is a schematic diagram of another positioning method according to an embodiment of the present disclosure;

FIG. 8 is a flowchart of yet another positioning method according to an embodiment of the present disclosure;

FIG. 9 is a schematic diagram of a navigation and positioning system in Example 1 according to an embodiments of the present disclosure;

FIG. 10 is a schematic diagram of a scenario in Example 1 according to an embodiment of the present disclosure;

DETAILED DESCRIPTION

The 3rd Generation Partnership Project (3GPP) released the first phase standard (Release 15) of the 5G NR wireless communication system in 2018. The 5G NR system has many features that help improve the accuracy of position information, such as large bandwidth, large antenna arrays, and so on. 3GPP has also started the next phase (Release 16) of the 5G NR positioning standard study item (SI). However, the SI sets the outdoor horizontal positioning accuracy to a range of 10 meters, which is far from meeting the positioning accuracy of the vehicle navigation and positioning system. Therefore, it is a problem to be researched and solved that how to make full use of the characteristics of the 5G NR system to provide accurate and reliable location information for the future IoV system.

First, the relevant signals involved in the embodiments of the present disclosure will be described.

In the embodiments of the present disclosure, a 5G NR positioning reference signal (PRS) is used to represent all available 5G NR positioning reference signals, which may specifically include: 5G NR uplink reference signals specified by the protocol, such as a sounding reference signal (SRS); a downlink reference signal, such as a synchronization signal and a channel state indication reference signal (CSI-RS), a custom 5G NR positioning reference signal, and a 5G NR positioning reference signal newly specified by the protocol in the further. The network can configure the time and frequency resources used to transmit the PRS at a transmitting end (including the base station or the vehicle) that transmits the 5G PRS for participating in vehicle positioning. The user terminal in the IoV is usually a vehicle, of course, the method described in this disclosure can also be applied to other terminals (such as mobile phones).

Figure 2:
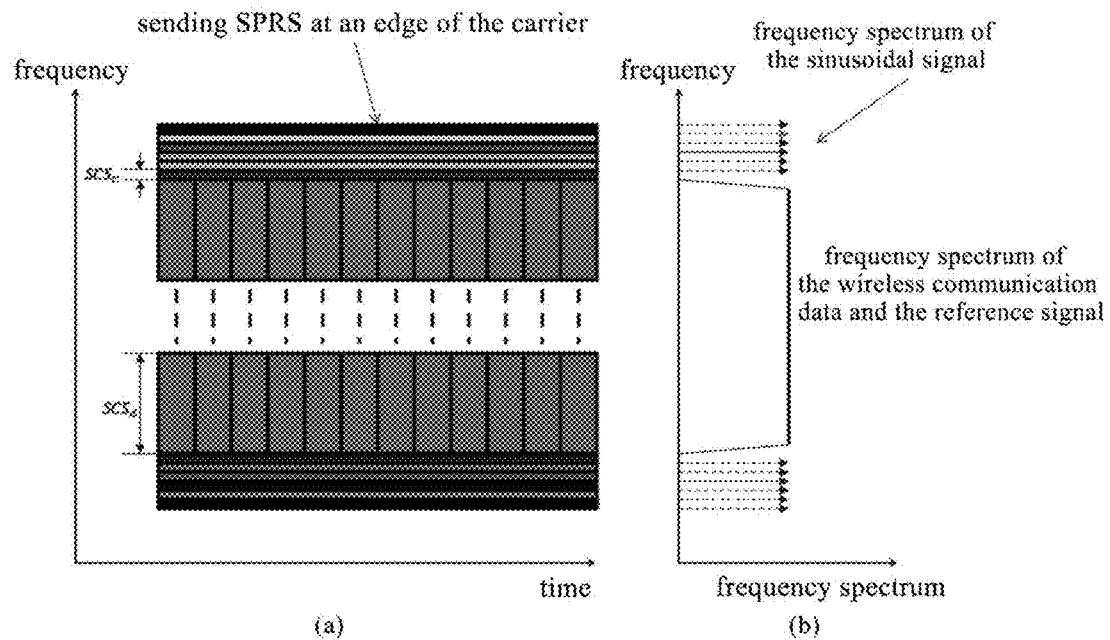
FIG. 2 is a schematic diagram of subcarrier distribution and frequency spectrum for transmitting C-RPS according to an embodiment of the present disclosure.

The embodiment of the present disclosure also provides a carrier phase reference signal (C-PRS) in 5G NR. Specifically, the C-PRS signal may be a sinusoidal carrier phase reference signal (SPRS) (SPRS is also referred to as a pure sinusoidal carrier signal), or a carrier signal that carries data. When the C-PRS signal is a pure sinusoidal carrier signal, the bandwidth occupied by the signal will be very small. Therefore, the sub-carrier spacing ($SCS_c$) between the carrier frequencies of the pure sinusoidal carrier signal used for positioning can be configured to be much smaller than the sub-carrier spacing ($SCS_d$) of data communication, as shown in FIG. 2.

The sub-carrier spacing between the carrier frequencies of the pure sinusoidal carrier signal used for positioning mainly considers the frequency error and Doppler shift of the transmitter. It depends on the speed of the vehicle and the carrier frequency. For example, assuming that the frequency error of the transmitter is less than 0.05 ppm, the speed of the vehicle is less than 450 km/h, and the carrier frequency is less than 6 GHz, the sub-carrier spacing $SCS_c$ between the carrier frequencies of the pure sinusoidal signal can be set to be less than 3 kHz, which is much small than the subcarrier spacing used for 5G NR data communication of 15 kHz/30 kHz. Since the SCS of the sub-carrier occupied by the C-PRS is smaller than the SCS of the data communication in the target carrier, the frequency resources of the carrier can be saved. In addition, in the embodiments of the present disclosure, subcarriers occupied by C-PRS sent by a plurality of devices (including base stations and vehicles) may be located at a guard band or an edge of the target carrier.

The transmission of C-PRS can be carried out at the edge of the carrier or the guard band of the carrier, as shown in FIG. 2(a). Since the carrier phase positioning signal is a pure sinusoidal signal, the inter-channel frequency spectrum caused by the positioning signal to adjacent carrier signals can be ignored, as shown in FIG. 2(b). In addition, since C-PRS can be transmitted at the edge of the carrier or the guard band of the carrier with very small subcarrier spacing, it only needs to occupy a very small data communication carrier resource or does not even occupy any data communication carrier resource. Since C-PRS can be transmitted at the edge of the carrier or the guard band of the carrier with very small sub-carrier spacing, it only needs to occupy a very small data communication carrier resource or does not even occupy any data communication carrier resource, thereby saving frequency resources.

At a vehicle receiving end, a receiver can measure the C-PRS from each neighboring cell and generate a carrier phase measurement value according to C-PRS configuration of each neighboring cell. Since C-PRS is a simple sinusoidal signal in the time domain, many carrier phase tracking technology in the related art can be used to obtain carrier phase measurements. Generally speaking, the receiver needs to implement a carrier phase lock loop (PLL) to measure the carrier phase. Moreover, PLLs have been widely used in communication and navigation receivers, so that the use of PLLs for measurement will not increase the measurement cost of the user terminal.

In addition, the basic principle of PLL in the related art is to generate a repetitive value of the measured signal inside the receiver and synchronize the phase of the repetitive value with the phase of the measured signal. The PLL in the related art is composed of three basic components: a phase detector, used for providing an output measurement result and being proportional to a carrier error to be compensated; a loop filter, which is a narrow-band low-pass filter, used to smooth the change caused by the noise outputted by the phase detector; and a digitally implemented numerically controlled oscillator (NCO) or an analog voltage controlled oscillator (VCO), which is used to generate a local replicated carrier based on the correction applied by the loop filter. Of course, in the embodiment of the present disclosure, in order to ensure the performance of the carrier phase measurement, a more advanced PLL structure may also be used to provide a more robust carrier phase measurement, which is not limited in the embodiment of the present disclosure.

In the embodiment of the present disclosure, when the PLL locks the inputted C-PRS signal, the phase of the repetitive signal inside the receiver is the output of the PLL. At this time, the C-PRS measurement result of the C-PRS at time k from cell i (can also be called the carrier phase measurement result) $\phi_i(k)$ can be expressed as follows:

$$\lambda\phi_i(k)=r_i(k)+\lambda*N_i+w_i$$

Among them, $r_i(k)$ is a distance from the UE to the cell i; $\lambda$ is the wavelength of C-PRS, $N_i$ is the integer ambiguity that needs to be solved during positioning calculation; $w_i$ is the carrier phase measurement error. The carrier phase measurement error is mainly affected by multipath.

In the embodiments of the present disclosure, after the carrier phase measurement result is obtained by monitoring the C-PRS sent from neighboring base stations or vehicles, the receiving end (specifically, each vehicle) can calculate the carrier phase measurement value (CP) and other positioning measurements (such as TOA/TDOA/RSRP) together to calculate the location information of the receiving end. For example, by measuring the C-PRS sent by a plurality of positioning reference devices (such as base stations with known position information), a plurality of $\phi_i(k)$ can be obtained, so that the distance between the vehicle and each positioning reference device, integer ambiguity and the carrier phase measurement error can be calculated, so as to determine the location of the vehicle with high accuracy.

It should be noted that in the embodiments of the present disclosure, the vehicle positioning is not limited to the above formula, because when the location of the vehicle is fixed, the measurement result of the SPRS measurement is also fixed, then the location of the vehicle can be determined through this relationship, for example: the vehicle can also be positioned through other relationships between the SPRS measurement results and the position. For another example, the vehicle may perform weighting processing based on the positioning results of other positioning measurements (such as TOA/TDOA/RSRP) and the positioning results obtained based on the reference signal (PRS, C-PRS) to obtain the location information of the vehicle.

In addition, in the embodiments of the present disclosure, the receiving end can also report the positioning measurement value to the location server, and the location server determines the location information of the vehicle with high accuracy by using various positioning algorithms in the related art to perform the measurement based on the PRS and C-PRS configuration information and the positioning measurement value provided by the vehicle. For the vehicle navigation and positioning system, the receiving end can keep the carrier phase loop in a locked state to provide carrier phase measurement without worrying about power consumption.

Specifically, in the embodiment of the present disclosure, in terms of time resources, the resource configuration for sending C-PRS may adopt the following methods.
1) Configuring to send C-PRS continuously. In this configuration, the transmitting end can send C-PRS continuously without interruption under the configured single frequency or a plurality of frequencies;
2) Configuring to send C-PRS periodically. In this configuration, the sending end can send C-PRS at the configured single frequency or a plurality of frequencies, according to the configured transmission period, time offset, and on/off duration;
3) Configuring C-PRS according to requirements. In this configuration, the cell can start or stop sending C-PRS according to a certain positioning requirement. The positioning requirement may be from a location server or a base station or a certain vehicle.

In terms of frequency resources, the resource configuration for sending C-PRS can also adopt the following methods.
1) Configuring a fixed specific frequency to send C-PRS;
2) Using a frequency hopping mode to configure different frequencies at different times to send C-PRS. There are many ways to configure the frequency hopping mode. For example, the frequency hopping mode may depend on the sending time of the C-PRS, the identifier (ID) of the sending end and the bandwidth configured by the network to send the C-PRS, and so on.

The network can provide C-PRS configuration information for the vehicle receiving end through a location server or a base station. In order to reduce the adjustment to the user terminal, the above-mentioned C-PRS configuration information can be provide to a certain vehicle receiving end by directly extending the current 3GPP long term evolution (LTE) positioning protocol (LTE positioning protocol, LPP) (TS 36.355) and positioning protocol A (LPPa). For example: C-PRS configuration information is added to the message used to configure the C-PRS configuration information in the LTE positioning protocol (LPP) and positioning protocol A (LPPa), which can reduce the adjustment of the vehicle positioning process, and can also avoid to transmit C-PRS configuration information through an additional signaling, so as to save transmission overhead. Of course, in this embodiment, the vehicle can also obtain PRS configuration information. The PRS configuration information refers to the current 3GPP LTE Positioning Protocol (LPP) (TS 36.355) and/or the positioning protocol A (LPPa), which is not limited here. In addition, in the embodiments of the present disclosure, the measurement of PRS may also refer to the current 3GPP LTE positioning protocol (LPP) (TS 36.355) and/or positioning protocol A (LPPa), which will not be described in detail here.

In this embodiment, the above-mentioned C-PRS configuration information can be used to measure the corresponding C-PRS on the corresponding frequency resource at the corresponding time, so as to improve the accuracy of the C-PRS measurement and also avoid the waste of power consumption caused by blind measurement of C-PRS by the user terminal.

In addition, in the embodiments of the present disclosure, the C-PRS configuration information may also be provided to the vehicle receiving end in the form of broadcast by each cell. The C-PRS configuration information usually includes at least the C-PRS transmission frequency and time resource configuration of each neighboring cell used for carrier phase positioning at the vehicle receiving end. The information related to the C-PRS configuration may also include the location of the transmitting antenna of each cell, so that the vehicle receiving end can use the measured value for positioning.

The above-mentioned C-PRS configuration information may be uniformly sent by the location server or the base station, or each base station may send its own SPRS configuration information, etc., which is not limited. Of course, PRS configuration information can also be obtained, so that the PRS can be measured according to the PRS configuration information. The PRS configuration information and SPRS configuration information may be obtained through the same message, or may be obtained in different ways, which is not limited in the embodiment of the present disclosure.

Figure 1:
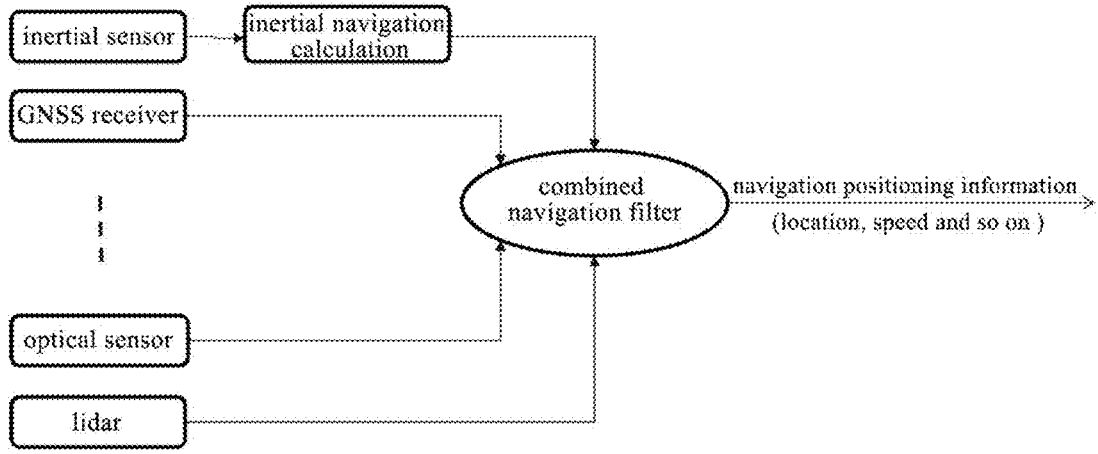
FIG. 1 is a schematic diagram of a vehicle integrated navigation and positioning system according to an embodiment of the present disclosure.
Figure 3:
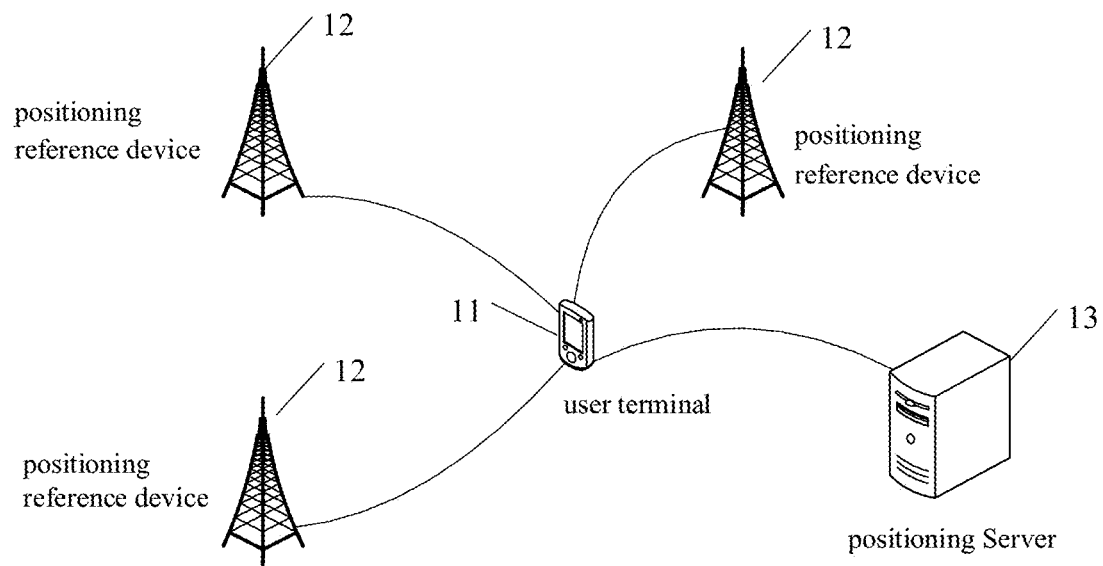
FIG. 3 is a schematic diagram of a network structure according to an embodiment of the present disclosure.

FIG. 3 is a schematic diagram of a network structure applicable to the embodiments of the present disclosure. As shown in FIG. 1, it includes a user terminal (User Equipment, UE) 11, a plurality of positioning reference devices 12, and a location server 13. The user terminal 11 may be a vehicle, a mobile phone, a tablet computer, a laptop computer, a personal digital assistant (PDA), a mobile Internet device (MID) or a wearable device. It should be noted that the specific type of the user terminal 11 is not limited in the embodiment of the present disclosure. The positioning reference device 12 may be a network side device, such as a base station, which may be a macro station, an LTE base station (evolved Node B, eNB), 5G NR NB, etc.; or the network-side device may also be a small station, such as a low-power node (LPN), pico, femto, and other small stations, or network side equipment can be an access point (AP); the base station can also be a central unit (CU), a network node is composed by the CU and a plurality of transmission reception points (TRP) managed and controlled by the CU. Alternatively, the above-mentioned positioning reference device 12 may be other user terminals other than the user terminal 11. For example, the user terminal 11 and other user terminals are vehicle user terminals. In this way, a Vehicle Cooperative Positioning System applicable to the Internet of Vehicles (Vehicle to X, V2X) can be realized. In addition, in the V2X vehicle cooperative positioning system, some of the plurality of positioning reference devices 12 may be user terminals other than the user terminal 11, and others of the positioning reference devices 12 may be network side devices. Of course, all the positioning reference devices 12 are other user terminals or network side devices other than the user terminal 11, which is not limited in the embodiment of the present disclosure. It should be noted that the specific type of the positioning reference device 12 is not limited in the embodiment of the present disclosure. In addition, the vehicle user terminal may be a vehicle-mounted communication device, or may be a user terminal (such as a mobile phone) located inside the vehicle, etc., which is not limited in the embodiment of the present disclosure. The above-mentioned location server 13 may be a server device, or the above-mentioned location server may be a certain network side device (such as a base station) where a wireless communication system is placed. Of course, in some cases, the above-mentioned location server 13 may be a positioning reference device 12. It should be noted that the specific type of the location server 13 is not limited in the embodiment of the present disclosure.

Figure 4:
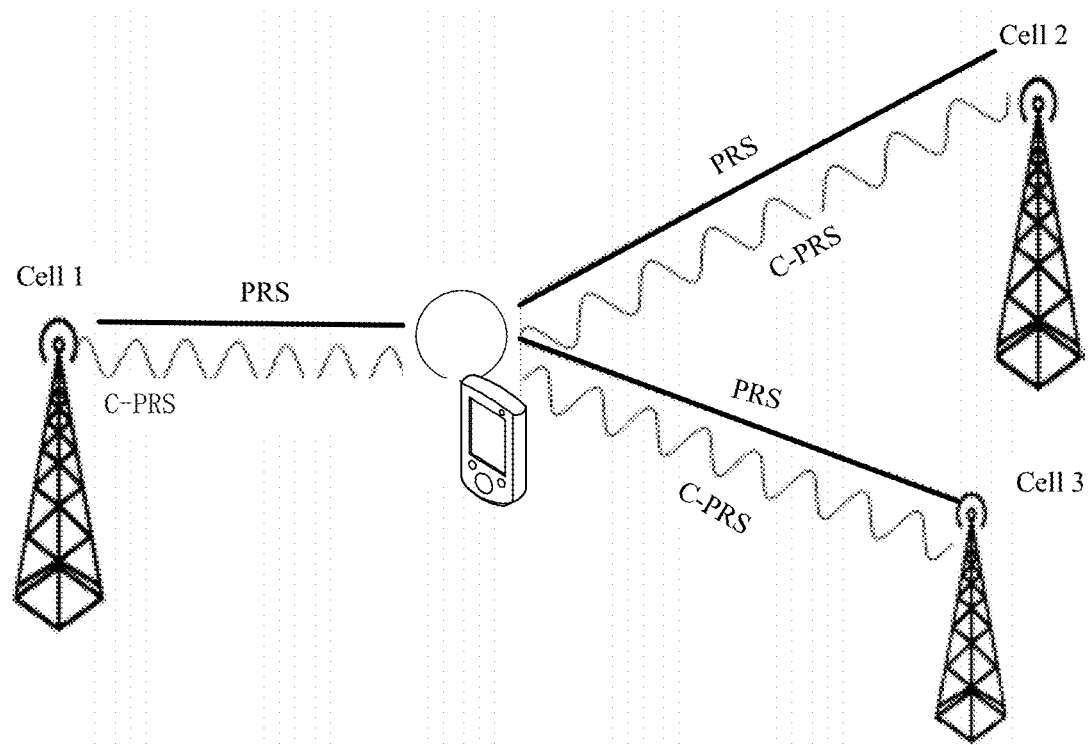
FIG. 4 is a schematic diagram of an application scenario of an embodiment of the present disclosure.

The embodiments of the present disclosure can be applied to the positioning of a user terminal in a wireless communication system. For example, as shown in FIG. 4, the user terminal measures PRS and C-PRS sent by network side devices of a plurality of cells to achieve positioning. For another example: as shown in FIG. 5, a vehicle user terminal measures the PRS and C-PRS sent by the network side device of the cell and other vehicles to achieve positioning.

The embodiments of the present disclosure provide a vehicle navigation and positioning system based on 5G NR reference signals. The vehicle navigation and positioning system based on 5G NR reference signals can be combined with GNSS and other navigation and positioning systems to form the vehicle integrated navigation and positioning system and the IoV coordinated navigation and positioning system, so as to provide ultra-precision, high availability, high reliability, low latency and low-cost positioning functions for the 5G NR IoV system.

The embodiments of the present disclosure also provide a vehicle integrated navigation and positioning system based on a positioning reference signal (PRS) and carrier phase reference signals (C-PRS, which may also be referred to as carrier phase measurement reference signal) in the 5G NR radio communication system. In the embodiments of the present disclosure, the 5G NR radio communication system positioning reference signal (PRS) represents all 5G NR reference signals that can be used for positioning, including 5G NR uplink and downlink reference signals specified in the protocol, and custom 5G NR positioning reference signal, and 5G NR positioning designed reference signal specified in the agreement in the future. The 5G NR carrier phase measurement reference signal (C-PRS) represents all reference signals that can be used to obtain the 5G NR carrier phase, including the 5G NR carrier phase reference signal described in the embodiments of the present disclosure.

In this system, the sending end of the reference signal (the sending end can be a base station and/or a vehicle) can send 5G NR PRS and 5G NR C-PRS at the same time. The receiving end (vehicle) obtains a positioning measurement value in the related art by measuring 5G NR PRS, such as time of arrival (TOA) of the positioning reference signal or a time difference of arrival (TDOA) of the positioning reference signal, reference signal received power (RSRP) of the positioning reference signal, a angle of arrival (AOA) of the positioning reference signal, etc. At the same time, the receiving end (vehicle) obtains the carrier phase (CP) by measuring 5G NR C-PRS. The carrier phase measurement value represents a phase difference between the received NR carrier reference signal and a carrier signal generated inside the receiver.

After monitoring various positioning measurement values (TOA/TDOA/AOA/RSRP/CP, etc.) obtained from the 5G NR PRS/C-PRS sent by the neighboring base stations or vehicles, the receiving end (vehicle) can use combine the positioning measurement values to calculate the location of the receiving end (vehicle). The receiving end can also report the positioning measurement values to the location server, and the location server accurately determines the location of the UE using various positioning algorithms in the related art based on the PRS and C-PRS configuration information and the positioning measurement values provided by the UE.

TOA/TDOA measurement errors are directly related to the design and configuration of 5G NR PRS signals (such as signal transmission frequency, period, bandwidth, etc.) and received signal quality (such as signal to interference and noise ratio (SINR)). By utilizing the high carrier frequency and large bandwidth of 5G NR, the measurement error of TOA/TDOA can be controlled to a range of several meters or less. Such accuracy has met the performance requirements of general point-to-point route navigation. However, since the IoV system in the future needs more accurate location information to support various functions of the IoV system, such as the automatic driving function of vehicles. These requirements cannot be met only using the 5G NR PRS.

The centimeter-level accuracy can be obtained by using the GNSS carrier phase measurement value. The main reason is that the measurement error of the carrier phase is very small, which is only about 10% of the carrier wavelength. For example, when the carrier frequency is 2.0 GHz and the carrier wavelength is 15 cm, the carrier phase measurement error is only in the range of 1 to 2 cm. In the same way, if 5G NR introduces C-PRS, the measurement error of the carrier phase measured by NR C-PRS will also be in the range of 1 to 2 cm. One of the favorable conditions for introducing carrier phase measurement in 5G NR is that under the normal working condition of 5G NR, the received signal power of 5G NR is much greater than the received signal power of GNSS. For example, in the design index of Beidou medium earth orbit (MEO) signal and global positioning system (GPS) L1 signal, the power of the satellite signal reaching the receiver in the ground is only −128.5 dBm in the entire carrier frequency bandwidth. When the 5G NR is in a normal working environment, the reference signal power at the receiving end is usually not less than −100 dBm in the 15 kHz bandwidth. Since the power of the received reference signal of 5G NR is much greater than the power of the GNSS to the receiver in the ground, the 5G NR receiver can lock the carrier phase reference signal more easily and faster than GNSS to provide the carrier phase measurement value. And, if phase lockout occurs, 5G NR receivers can recover phase lock faster than GNSS receivers.

The main difficulty in using carrier phase measurement value for positioning is that the carrier phase measurement value includes an unknown number that is an integer a plurality of the carrier wavelength, usually called Integer Ambiguity. When using carrier phase measurement value for positioning, the integer ambiguity needs to be acquired first. Therefore, how to obtain the integer ambiguity in the carrier phase measurement value is one of the keys for positioning using the carrier phase measurement value. Compared with positioning using the carrier phase measurement value in GNSS, one of the advantages of positioning using the carrier phase measurement value in 5G NR is that the high carrier frequency and large bandwidth of 5G NR can be used to control the measurement error of TOA/TDOA to a few meters or less, thereby facilitating to quickly search for integer ambiguity. In GNSS, this goal cannot be achieved by adjusting GNSS transmission parameters.

In the embodiments of the present disclosure, the basic process of a vehicle navigation and positioning system based on 5G NR PRS and C-PRS is as follows.

a) The transmitting end of PRS/C-PRS (base station and/or vehicle) provides relevant PRS and C-PRS configuration information for the receiving end (vehicle) of PRS/C-PRS through the 5G NR network, including the transmission period of PRS, time-frequency resources, transmission power; transmission frequency and power of C-PRS; location of the transmitting antenna, etc.; if the vehicle is required to perform a positioning estimation algorithm to obtain the positioning result, the vehicle also needs to obtain the absolute location of each base station.

b) The sending end of PRS/C-PRS (base station and/or vehicle) sends PRS and C-PRS on the configured time-frequency resources;

c) The receiving end (vehicle) measures the PRS and C-PRS according to the PRS/C-PRS configuration information provided by the transmitting end to obtain the positioning measurement value. The positioning measurement value can include the time of arrival (TOA) or time difference of arrival (TDOA) of the reference signal, the reference signal received power (RSRP), the angle of arrival (AOA) of the reference signal, and measured value of the carrier phase (CP), etc.

d) The receiving end (vehicle) calculates the absolute or relative location of the vehicle with high accuracy according to the PRS and C-PRS configuration information and the positioning measurement values (TOA/TDOA, AOA, RSRP, CP). If the location information of the vehicle is required for other positioning services, the receiving end can report the positioning result to the 5G NR Position Management Function (LMF), or report the positioning measurement value to the LMF, and the LMF calculates the location of the vehicle.

The advantages of the vehicle positioning method based on 5G NR PRS and C-PRS in the embodiments of the present disclosure are at least as follows.

a) Vehicle positioning is performed through the PRS and C-PRS sent by the 5G NR system itself, which can work when the GNSS satellite signal is weak or cannot be received. Operators can also adjust and configure the number, position, and transmitting frequency of the sending end that send PRS and C-PRS signals as needed to avoid problems similar to that GNSS cannot work due to weak received signals;

b) Operators can reduce measurement errors of TOA/TDOA by adjusting the configuration of sending PRS according to their needs, making it easier to search for integer ambiguity in carrier phase measurements;

c) In a normal working environment, the signal power at the receiving end of 5G NR is much greater than the signal power of the GNSS signal reaching the ground. Compared with GNSS, it is easier and faster to lock the 5G NR carrier signal; and if losing phase lock occurs, the phase lock can be restored quickly;

d) Utilizing the large bandwidth and high data rate of the 5G NR wireless communication system, the time used for location information communication and positioning measurement can be reduced to a few milliseconds or less.

Hereinafter, the positioning method of the embodiment of the present disclosure will be introduced respectively from each device.

FIG. 6 is a flowchart of a positioning method provided by an embodiment of the present disclosure. As shown in FIG. 6, it includes the following steps.

601. measuring, by a first vehicle, a positioning reference signal PRS and a carrier phase reference signal C-PRS sent by a plurality of positioning reference devices to obtain a plurality of PRS measurement results and a plurality of C-PRS measurement results, the plurality of positioning reference devices including a network side device and other vehicles;

602. performing, by the first vehicle, a positioning operation according to the plurality of PRS measurement results and the plurality of C-PRS measurement results.

Wherein, the positioning operation includes: sending the plurality of PRS measurement results and the plurality of C-PRS measurement results to a location server, and receiving location information of the first vehicle determined based on the plurality of PRS measurement results and the plurality of C-PRS measurement results from the location server; or the positioning operation includes: determining, by the first vehicle, the location information of the first vehicle according to the plurality of PRS measurement results and the plurality of C-PRS measurement results.

The location information of the first vehicle includes at least one of the following information: a location of the first vehicle, a relative distance between the first vehicle and other vehicles, change information of the relative distance between the first vehicle and other vehicles, a relative location of the first vehicle with respect to other vehicles, and change information of the relative location of the first vehicle with respect to other vehicles.

In the embodiments of the present disclosure, the plurality of positioning reference devices described above may include a network side device (such as a base station) in a cell and other vehicle devices. In the embodiment of the present disclosure, the plurality of positioning reference devices may refer to two or more positioning reference devices, for example, it may be determined according to requirements, which is not limited in the embodiment of the present disclosure.

The measurement on the PRS can be to measure arrival time difference or received power of each PRS and other parameters.

In the embodiments of the present disclosure, C-PRS may be a sinusoidal carrier positioning reference signal used for carrier phase positioning. In addition, C-PRS is a sinusoidal carrier signal (or may also be called a pure sinusoidal carrier signal), and the plurality of positioning reference devices send the C-PRS on different frequency resources. For example, network side devices in different adjacent cells can send the C-PRS in different subcarriers. In this way, the vehicle can detect phase information of different C-PRS.

In the embodiment of the present disclosure, the PRS and C-PRS sent by the plurality of positioning reference devices are measured, the location information of the first vehicle can be determined according to the measurement results. In addition, since the measurement error of the carrier phase measurement value can reach centimeter level or less, the location information of the first vehicle can be determined with high accuracy by the above steps combining the carrier signal phase measurement value and the positioning method using the PRS.

It should be noted that the above method sends the carrier phase reference signal through the 3GPP wireless communication network, and performs positioning operations based on the measured PRS measurement results and C-PRS measurement results. Because the carrier reference signal is sent through the 3GPP wireless communication network itself, when a satellite signal is weak or cannot be received in the global navigation satellite system (GNSS), the method can still work, positioning can still be performed by using C-PRS measurement results (carrier signal phase measurement value) of 3GPP and the PRS measurement results, so that the location information of the first vehicle can be determined with high accuracy. Wherein, positioning using PRS measurement results is a positioning method well known to those skilled in the art. In the embodiments of the present disclosure, the positioning method may combine the C-PRS measurement results and the PRS measurement results, thereby improve the positioning accuracy of the first vehicle.

It should be noted that, in the embodiments of the present disclosure, the implementation for determining the location information of the first vehicle based on the plurality of PRS measurement results and the plurality of C-PRS measurement results is not limited, because after the first vehicle obtains the plurality of PRS measurement results and the plurality of C-PRS measurement results sent by the plurality of positioning reference devices, the location information of the first vehicle can be obtained through various mathematical solutions. For example, positioning algorithms of various related technologies, such as an LTE positioning protocol (LPP or LPPa), is used to determine the location information of the first vehicle. Optionally, the first vehicle or the location server can determine the location of the first vehicle by combining the measurement results of PRS and C-PRS and position information of transmitting antenna of the plurality of positioning reference devices, to obtain position information with higher accuracy.

Optionally, the measurement of the C-PRS may be a carrier phase measurement value obtained by measuring the phase difference between the received carrier reference signal and the carrier signal generated inside the receiver.

As an optional implementation, the first vehicle measures the C-PRS sent by the plurality of positioning reference devices to obtain the plurality of C-PRS measurement results, includes: measuring, by the first vehicle, the C-PRS sent by the plurality of positioning reference devices on a plurality of different frequency resources to obtain a plurality of C-PRS measurement results, wherein different positioning reference devices use different frequency resources to send C-PRS.

In this implementation, different positioning reference devices can use different frequency resources to send C-PRS. For example, different positioning reference devices send C-PRS in different subcarriers, so that the first vehicle can measure different C-PRS to obtain measurement results, so as to improve the positioning accuracy of the first vehicle.

Specifically, in the embodiment of the present disclosure, the first vehicle may obtain PRS configuration information and C-PRS configuration information of the plurality of positioning reference devices, and both the PRS configuration information and the C-PRS configuration information include frequency configuration information and time configuration information; then, in the above step 601, the first vehicle further measures the PRS sent by the plurality of positioning reference devices according to the PRS configuration information of the plurality of positioning reference devices, and measures the C-PRS sent by the plurality of positioning reference devices according to the C-PRS configuration information of the plurality of positioning reference devices.

Optionally, in this implementation, the method further includes: obtaining, by the first vehicle, the C-PRS configuration information of the plurality of positioning reference devices, the C-PRS configuration information of each positioning reference device includes frequency configuration information and time configuration information of the C-PRS sent by the positioning reference device.

The measuring, by the first vehicle, the C-PRS sent by the plurality of positioning reference devices on a plurality of different frequency resources to obtain the plurality of C-PRS measurement results, includes: measuring, by the first vehicle, the C-PRS sent by the plurality of positioning reference devices according to the C-PRS configuration information of the plurality of positioning reference devices to obtain the plurality of C-PRS measurement results.

Optionally, in the foregoing embodiment, each positioning reference device configures a fixed frequency resource to send the C-PRS, or each positioning reference device configures a different frequency resource to send C-PRS at a different time.

Wherein, the frequency resource for each positioning reference device to send the C-PRS may be a pre-configured or predefined carrier frequency. For example, each cell sends the C-PRS for carrier phase positioning on the pre-configured or predefined carrier frequency.

Wherein, the configuring different frequencies at different times to transmit C-PRS may configure different frequencies for each cell at different times to transmit C-PRS using a frequency hopping mode. Among them, there are a plurality of the frequency hopping mode configuration methods, for example, the frequency hopping mode can depend on the sending time of the C-PRS, the cell ID and the bandwidth for sending the C-PRS in the network configuration, etc.

In this implementation, it is possible to flexibly configure the frequency resources of the C-PRS sent by each positioning reference device.

As an optional implementation, the measuring, by the first vehicle, the C-PRS sent by the plurality of positioning reference devices to obtain the plurality of C-PRS measurement results, includes: measuring, by the first vehicle, C-PRS continuously sent by the plurality of positioning reference devices to obtain the plurality of C-PRS measurement results; or measuring, by the first vehicle, C-PRS periodically sent by the plurality of positioning reference devices to obtain the plurality of C-PRS measurement results; or measuring, by the first vehicle, C-PRS sent by the plurality of positioning reference devices on demand to obtain the plurality of C-PRS measurement results.

In this implementation, the network configures time for sending C-PRS for each cell (a positioning reference device in the cell) that participates in carrier phase positioning. Specifically, there are a plurality of mode to configure time for sending C-PRS for a certain cell (a positioning reference device in the cell as follows.

Configuring to send the C-PRS continuously. In this configuration, the positioning reference device in the cell can send the C-PRS continuously and without interruption on a single frequency or a plurality of frequencies.

Configuring to send the C-PRS periodically. In this configuration, the positioning reference device in the cell can send the C-PRS on a single frequency or a plurality of frequencies according to the configured transmission period, time offset, or on (or off duration).

Configuring to start or stop sending the C-PRS on demand. In this configuration, the positioning reference device in the cell can start or stop sending the C-PRS according to a certain positioning demand, the positioning demand can come from a location server or a vehicle or a base station.

In this implementation, the positioning reference device can flexibly configure to send the C-PRS according to requirements, so as to improve the flexibility of the system.

As an optional implementation, the PRS measurement result may include: at least one of RSTD and RSRP.

The C-PRS measurement result includes: a C-PRS-CP measurement value.

In this implementation, at least one of RSTD and RSRP of the PRS sent by the positioning reference device can be measured, and the C-PRS-CP measurement value of the C-PRS sent by the positioning reference device can be measured. Since the measurement error of the C-PRS-CP measurement value can be to the centimeter level or less, the positioning accuracy of vehicle may be further improved by combining the C-PRS-CP measurement value and at least one of RSTD and RSRP.

As an optional implementation, a subcarrier spacing (SCS) of a subcarriers occupied by the C-PRS sent by the plurality of positioning reference devices is smaller than the SCS of the data communication in a target carrier, and the target carrier includes subcarriers occupied by the C-PRS sent by the plurality of positioning reference devices.

As an optional implementation, the sending the plurality of PRS measurement results and a plurality of C-PRS measurement results to the location server includes: sending a report message to the location server, wherein the report message includes the plurality of PRS measurement results and an information element for reporting the C-PRS measurement result, the information element includes the C-PRS measurement result of each C-PRS.

Wherein, the above report message may be a report message defined in the current positioning protocol for reporting the PRS measurement result. For example, in this embodiment, C-PRS measurement results (for example: the C-PRS-CP measurement value) and other positioning measurement (for example, at least one of RSTD and RSRP) are reported together to a location server or a base station of the network for high-precision positioning of the vehicle. The reporting method can directly extend the current 3GPP LTE positioning protocol (LPP) (TS 36.355) and positioning protocol A (LPPa), and the information element (IE) for reporting the C-PRS measurement result is added to the report message for reporting the PRS measurement result.

In this embodiment, since the plurality of PRS measurement results and the plurality of C-PRS measurement results are reported through a same message, the above information elements can be directly added to the report message for reporting the PRS measurement result defined by the current positioning protocol, thereby reducing the adjustment of the positioning process for the vehicle, avoiding adding an additional message, and saving the power consumption and cost of the vehicle.

Optionally, in this implementation, the information element further includes: at least one of a cell identifier corresponding to each C-PRS, a C-PRS index, a reference time during measurement, and a quality indicator of a carrier measurement value.

In this implementation, it is possible to report the plurality of PRS measurement results and the plurality of C-PRS measurement results to the location server, as well as at least one of a cell identifier corresponding to each C-PRS, a C-PRS index, a reference time during measurement, and a quality indicator of a carrier measurement value, which can further improve the positioning accuracy of the vehicle. For example: the LPP/LPPa information element used to report the C-PRS measurement result (for example: C-PRS carrier phase measurement) include the cell ID, the C-PRS index, the reference time during measurement, the C-PRS measurement result (for example: a carrier phase value) and the quality indicator of the carrier measurement value. In this way, after the location server or the first vehicle obtains the PRS measurement result (for example: at least one of RSTD and RSRP) and the C-PRS measurement result (for example: C-PRS-CP), it can determine the location of the first vehicle with high accuracy according to the PRS and C-PRS configuration information and the positioning measurement value provided by the first vehicle by using various positioning algorithms of related technologies. In addition, the first vehicle may also use the position information of the transmitting antenna of each cell, and perform positioning using the measured value.

As an optional implementation, the method further includes at least one of the following: exchanging, by the first vehicle and other vehicles, the plurality of PRS measurement results and the plurality of C-PRS measurement results measured by the first vehicle and a plurality of PRS measurement results and a plurality of C-PRS measurement results measured by the other vehicles; exchanging, by the first vehicle and other vehicles, location information of the first vehicle and location information of the other vehicles; sending, by the first vehicle, the PRS and C-PRS to other vehicles; exchanging, by the first vehicle and other vehicles, PRS configuration information and C-PRS configuration information of the first vehicle and PRS configuration information and C-PRS configuration information of the other vehicles.

Wherein, the above-mentioned other vehicle may be a vehicle other than the first vehicle.

In this embodiment, if the first vehicle receives a plurality of PRS measurement results and a plurality of C-PRS measurement results measured by other vehicles, then the first vehicle can combine the PRS measurement results and the C-PRS measurement results measured by itself and the PRS measurement results and the C-PRS measurement results measured by the other vehicles for positioning, thereby improving the positioning accuracy of vehicle.

In addition, if the location information of the other vehicles is received, the first vehicle can combine the location information of the other vehicles, thereby improving the positioning accuracy of vehicle.

In addition, in this embodiment, PRS and C-PRS can also be sent to other vehicles, so that the other vehicles can measure the PRS and C-PRS to achieve positioning.

In addition, if the PRS configuration information and C-PRS configuration information of the other vehicles are obtained, the PRS configuration information and C-PRS configuration information may be used to measure the PRS and C-PRS sent by the other vehicles, thereby improving the positioning accuracy of vehicle.

It should be noted that the embodiments can be applied to the V2X vehicle cooperative positioning system, and can also be applied to other scenarios, such as other scenarios with relatively poor network signals, etc., which is not limited in the embodiment of the present disclosure. In addition, in this implementation, it is also possible to perform positioning based on PRS and C-PRS sent by at least one network side device and PRS and C-PRS sent by at least one vehicle user terminal, and a V2X vehicle cooperative positioning system is achieved.

In order to improve the accuracy and reliability of positioning, in the above-mentioned method in the embodiment of the present disclosure, the first vehicle may also measure the GNSS signal sent by the global navigation satellite system GNSS to obtain the GNSS signal measurement result; and, the first vehicle obtains the positioning measurement result measured by the positioning sensor set by the first vehicle. Then, in the above step 602, the first vehicle further performs the positioning operation according to the plurality of PRS measurement results, the plurality of C-PRS measurement results, the GNSS signal measurement result, and the positioning measurement result. For example, the plurality of PRS measurement results and the plurality of C-PRS measurement results are sent to the location server, and the location information of the first vehicle determined according to the plurality of PRS measurement results and the plurality of C-PRS measurement results returned by the location server is received; or the location information of the first vehicle is determined according to the plurality of PRS measurement results and the plurality of C-PRS measurement results.

Optionally, when the GNSS signal quality meets a predetermined condition (for example, the signal quality meets a predetermined threshold, the number of satellite signals that can be received meets a predetermined number, etc.), better positioning results can be obtained based on GNSS. In the case that the GNSS signal quality does not meet the predetermined condition, positioning may be performed based on the plurality of PRS measurement results, the plurality of C-PRS measurement results, and the positioning measurement result, so as to obtain a better positioning result. In addition, the embodiments of the present disclosure may also perform weighting processing on the positioning results obtained in the above various ways to obtain a weighted result, and the weighted value of positioning results is positively correlated with the reliability of the positioning result. It should be noted that the embodiments of the present disclosure do not specifically limit this.

Optionally, in the embodiment of the present disclosure, the first vehicle sends the plurality of PRS measurement results and the plurality of C-PRS measurement results to the location server. Specifically, a report message may be sent to the location server, and the report message includes the plurality of PRS measurement results and an information element for reporting the C-PRS measurement result, wherein the information element includes the C-PRS measurement result of each C-PRS. Further, the information element may further include: at least one of the cell identifier corresponding to each C-PRS, the C-PRS index, the reference time during measurement, and the quality indicator of the carrier measurement value.

It should be noted that the various optional implementation in the embodiments of the present disclosure can be implemented in combination with each other, or can be implemented separately, which is not limited by the embodiments of the present disclosure.

FIG. 7 is a flowchart of another positioning method provided by an embodiment of the present disclosure, which is applied to a network side device (such as a base station), as shown in FIG. 7, and includes the following steps.

701. sending, by a network side device, PRS and the C-PRS to a first vehicle, so that the first vehicle measures the PRS to obtain the PRS measurement result, and measures the C-PRS to obtain the C-PRS measurement result.

Wherein, the PRS measurement result and the C-PRS measurement result are used for the location information of the first vehicle, and the location information of the first vehicle includes at least one of the following information: a location of the first vehicle, a relative distance between the first vehicle and other vehicles, change information of the relative distance between the first vehicle and other vehicles, a relative location of the first vehicle with respect to other vehicles, and change information of the relative location of the first vehicle with respect to other vehicles.

Here, when the network side device sends the C-PRS, the following ways are used:
1) The network side device continuously sends the C-PRS to the first vehicle;
2) The network side device periodically sends the C-PRS to the first vehicle;
3) The network side device sends the C-PRS to the first vehicle on demand.

Further, in the embodiment of the present disclosure, before sending the PRS or C-PRS, the network side device may also obtain GNSS signal quality information of the first vehicle, and the GNSS signal quality information includes the number of satellite signals received by the first vehicle and receiving quality of the satellite signals; then, the network side device determines sending parameters of the PRS and C-PRS sent to the first vehicle according to the GNSS signal quality information of the first vehicle. The sending parameters include transmission frequency, transmission power, and transmission times per time unit. Among them, GNSS signal quality information with a better quality corresponds to sending parameters with a lower sending level. Optionally, the network side device may send the PRS and C-PRS to the first vehicle according to the sending parameters.

Here, the quality of GNSS signal quality information can be evaluated by the number of received GNSS signals and signal quality indicators (such as received signal power, etc.). A sending parameter with a higher level corresponds to at least one of larger transmission times per time unit, higher transmission power and a wider transmission frequency bandwidth, and a sending parameter with a lower level corresponds to at least one of less transmission times per time unit, lower transmission frequency and narrower transmission frequency bandwidth.

Through the above method, in an environment where GNSS cannot provide high-precision location information, the embodiments of the present disclosure can adjust and configure the number, position, transmission frequency, transmission power, etc. of the sending end that sends the PRS and C-PRS signal, so as to ensure the performance of the vehicle navigation and positioning system. For example, in a place where the vehicle can effectively receive the GNSS signal, the 5G NR carrier signal phase positioning reference signal is not sent or reduced to save system resources; and in a place where the GNSS signal is weak or cannot receive the GNSS signal, the transmission frequency or transmission power of the 5G NR carrier signal phase positioning reference signal, so as to ensure the performance of the vehicle navigation and positioning system.

Here, the network side device may obtain the GNSS signal quality information of the first vehicle through one or more of the following methods.
1) The network side device receives the global navigation satellite system GNSS signal measurement result of the first vehicle; the network side device determines the GNSS signal quality information of the first vehicle according to the GNSS signal measurement result of the first vehicle;
2) The network side device requests the GNSS signal quality information of the first vehicle from the location server, and receives the GNSS signal quality information of the first vehicle returned by the location server.

In the embodiments of the present disclosure, different network side devices may send the C-PRS to the first vehicle through different frequency resources. Each network side device can be configured with a fixed frequency resource to send the C-PRS, or each network side device can configure a different frequency resource to send the C-PRS at a different time.

In order to simplify the processing of receiving the reference signal by the terminal, in the embodiment of the present disclosure, the network side device may also send the PRS configuration information and the C-PRS configuration information to the first vehicle, the PRS configuration information and the C-PRS configuration information both include frequency configuration information and time configuration information.

FIG. 8 is a flowchart of another positioning method provided by an embodiment of the present disclosure, which is applied to a location server, as shown in FIG. 8, and includes the following steps.

801. receiving, by the location server, a positioning reference signal PRS measurement result of a PRS sent by a first vehicle to a plurality of positioning reference devices, wherein the plurality of positioning reference devices include a network side device and other vehicles.

802. receiving, by the location server, a carrier phase reference signal C-PRS measurement result of the C-PRS sent by the first vehicle to the plurality of positioning reference devices.

803. determining, by the location server, location information of the first vehicle according to the plurality of PRS measurement results and the plurality of C-PRS measurement results.

Wherein, the location information of the first vehicle includes at least one of the following information: a location of the first vehicle, a relative distance between the first vehicle and other vehicles, change information of the relative distance between the first vehicle and other vehicles, a relative location of the first vehicle with respect to other vehicles, and change information of the relative location of the first vehicle with respect to other vehicles.

It should be noted that there is no strict time sequence relationship between the above steps 801 and 802, and they can be executed at the same time or any one step is executed first, and the other is executed later.

In the embodiment of the present disclosure, after the above step 803, the location server may also send the location information of the first vehicle to the first vehicle, and/or send the location information of the first vehicle to the other vehicles.

In the embodiment of the present disclosure, before step 803, the location server may also receive the GNSS signal measurement result and the positioning measurement result sent by the first vehicle, and the positioning measurement result is a positioning result measured by a positioning sensor of the first vehicle. Then, in step 803, the location server further determines the location information of the first vehicle according to the plurality of PRS measurement results, the plurality of C-PRS measurement results, the GNSS signal measurement result, and the positioning measurement result.

Further, the location server may also receive a request message for requesting the GNSS signal quality information of the first vehicle sent by the network side device, and send the GNSS signal quality information of the first vehicle to the network side device, so that the network side device determines the sending parameters of the PRS and C-PRS sent to the first vehicle according to the GNSS signal quality information of the first vehicle.

The methods of the embodiments of the present disclosure are described from the vehicle, the network side device (the base station), and the location server respectively. In order to better understand the positioning method of the embodiments of the present disclosure, a further description will be given below in conjunction with several specific examples.

Example 1

This example is described with a navigation and positioning system in a single vehicle as shown in FIG. 9. Specifically, this example combines vehicle positioning methods of 5G NR PRS and C-PRS and various vehicle positioning methods of related technologies, which can provide more accurate and reliable location information for the Internet of Vehicles system.

The vehicle integrated navigation and positioning system based on 5G NR positioning technology given in Example 1 works as follows. When a vehicle fails to receive a GNSS satellite signal, or fails to receive a sufficient number of GNSS satellite signals so that an absolute location of the vehicle cannot be determined with a high accuracy, the absolute location of the vehicle is determined with high accuracy by combining a measurement value obtained by the positioning reference signal sent by the base station and a measurement value provided by the positioning sensor of the vehicle itself.

As shown in FIG. 10, if a vehicle receives PRSs sent by a sufficient number of base stations, the absolute location of the vehicle can be determined with high accuracy. Through 5G NR wireless communication system characteristics (for example, high frequency, large bandwidth, antenna array with a large number of antenna elements), a meter-level absolute position positioning accuracy may be achieved. If a vehicle receives PRS and C-PRS sent from a sufficient number of base stations, it can use related technologies of the time difference of arrival (OTDOA) positioning technology, angle of arrival (AOA)+timing advance (TA)/RSRP positioning technology or carrier phase positioning technology, after the integer ambiguity is resolved, the absolute location of the vehicle can be determined with ultra-precision, thereby reaching centimeter-level positioning accuracy.

In addition, operators can adjust and configure the number, position, transmission frequency, transmission power, etc. of the sending end that send PRS and C-PRS signals according to their needs in an environment where GNSS cannot provide high-precision location information, to ensure the performance of the vehicle navigation and positioning system. For example, in a place where the vehicle can effectively receive the GNSS signal, the 5G NR carrier signal phase positioning reference signal is not sent or reduced to save system resources; and in a place where the GNSS signal is weak or cannot be received, the transmission frequency and transmission power of the 5G NR carrier signal phase positioning reference signal are increased, to ensure the performance of the vehicle navigation and positioning system.

Example 2

This example is described with a navigation and positioning system in which a plurality of vehicles cooperate with each other. It should be pointed out that in the IoV cooperative navigation and positioning system based on 5G NR PRS and C-PRS, the vehicle accurately calculates a relative distance, a relative position or a change of the relative distance, a charge of the relative location of the vehicles by measuring the PRS or C-PRS reference signal sent between the vehicles, and does not necessarily depend entirely on the PRS or C-PRS reference signal sent by the base station.

Figure 11:
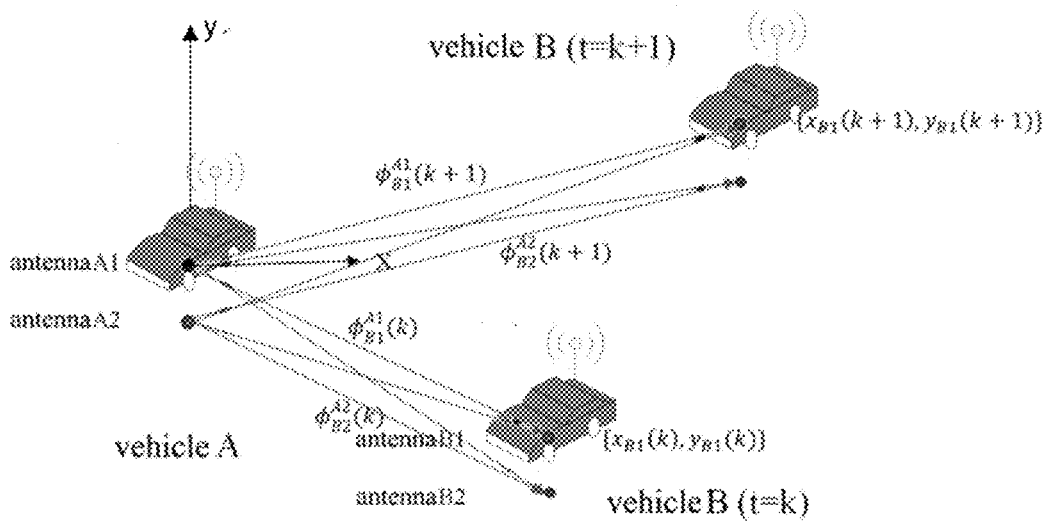
FIG. 11 is a schematic diagram of a scenario in Example 2 according to an embodiment of the present disclosure.

For example, as shown in FIG. 11, it is assumed that vehicle B measures the C-PRS reference signal from vehicle A, the PLL of the receiver of vehicle B has locked to the C-PRS signal of vehicle A, and at time k and k+1, the vehicle B measures a carrier phase observation values $\phi_B^A(k)$ and $\phi_B^A(k+1)$ of the C-PRS from vehicle A. The carrier phase observation values $\phi_B^A(k)$ and $\phi_B^A(k+1)$ are related to the distance between vehicle A and vehicle B, $r_B^A(k)$ and $r_B^A(k+1)$ as follows:

$$\lambda\phi_B^A(k)=r_B^A(k)+\lambda N+w_k$$

$$\lambda\phi_B^A(k+1)=r_B^A(k+1)+\lambda N+w_{k+1}$$

In the above formula, N is the integer ambiguity of the carrier phase observations $\phi_B^A(k)$ and $\phi_B^A(k+1)$; $w_k$ and $w_{k+1}$ are the carrier phase measurement errors. Therefore, between time k and k+1, the change in the relative distance between vehicle A and vehicle B can be directly obtained from the carrier phase observation values $\phi_B^A(k)$ and $\phi_B^A(k+1)$, it is not necessary to solve the integer ambiguity N:
$r_B^A(k+1) - r_B^A(k) = \lambda(\phi_B^A(k+1) - \phi_B^A(k))$.

For another example, it is assumed that vehicle A uses a plurality of antennas to transmit the PRS and C-PRS reference signals, and vehicle B uses a plurality of antennas to measure the PRS and C-PRS reference signals from vehicle A, and the PLL of the receiver of vehicle B has locked to the C-PRS signal of the vehicle A (FIG. 11 assumes that vehicle A uses dual antennas to transmit PRS and C-PRS reference signals, and vehicle B uses dual antennas to measure the PRS and C-PRS reference signals from vehicle A, and the PLL of the receiver of the vehicle B has locked the C-PRS signal of vehicle A). At time k and k+1, the antennas B1 and B2 of vehicle B measure the two sets of carrier phase observation values of the C-PRS from antennas A1 and A2 of vehicle A $\{\phi_j^i(k), i=\{A1, A2\}, j=\{B1, B2\}\}$ and $\{\phi_j^i(k+1)\}$. The carrier phase observation value and the distance $r_j^i(k)$ and $r_j^i(k+1)$ between the vehicle A antenna and the vehicle B antenna are related as follows:

$$\lambda\phi_j^i(t) = r_j^i(t) + \lambda N + w_{i,j}(t), i=\{A1,A2\}, j=\{B1,B2\}, t=\{k, k+1\}$$

In the above formula, N is the integer ambiguity of the carrier phase observation value. Therefore, between the time k and k+1, the change of the relative position coordinates of the vehicle A and the vehicle B can be measured by the change of the carrier phase observation value, namely $\{\lambda\phi_j^i(k+1) - \lambda\phi_j^i(k), i=A1, A2; j=B1, B2\}$ is obtained, it is not necessary to resolve the integer ambiguity N. In FIG. 11, vehicle A is used as the reference coordinate system. A change between the position coordinates $\{x_j(k), y_j(k), j=B1, B2\}$ of the antennas B1 and B2 of vehicle B at time k and the position coordinates $\{x_j(k+1), y_j(k+1), j=B1, B2\}$ of the antennas B1 and B2 of vehicle B at time k+1 by taking the vehicle A as the reference coordinate system is also obtained through the carrier phase observation value $\{\phi_j^i(k), i=\{A1, A2\}, j=\{B1, B2\}\}$, it is not necessary to resolve the integer ambiguity N.

This is especially suitable for the functions of fast tracking and monitoring the movement of surrounding vehicles, predicting and avoiding traffic accidents, which are required for automatic driving of vehicles. Therefore, the IoV navigation and positioning system based on 5G NR PRS and C-PRS can provide higher positioning accuracy than the navigation and positioning system in the related art.

Figure 12:
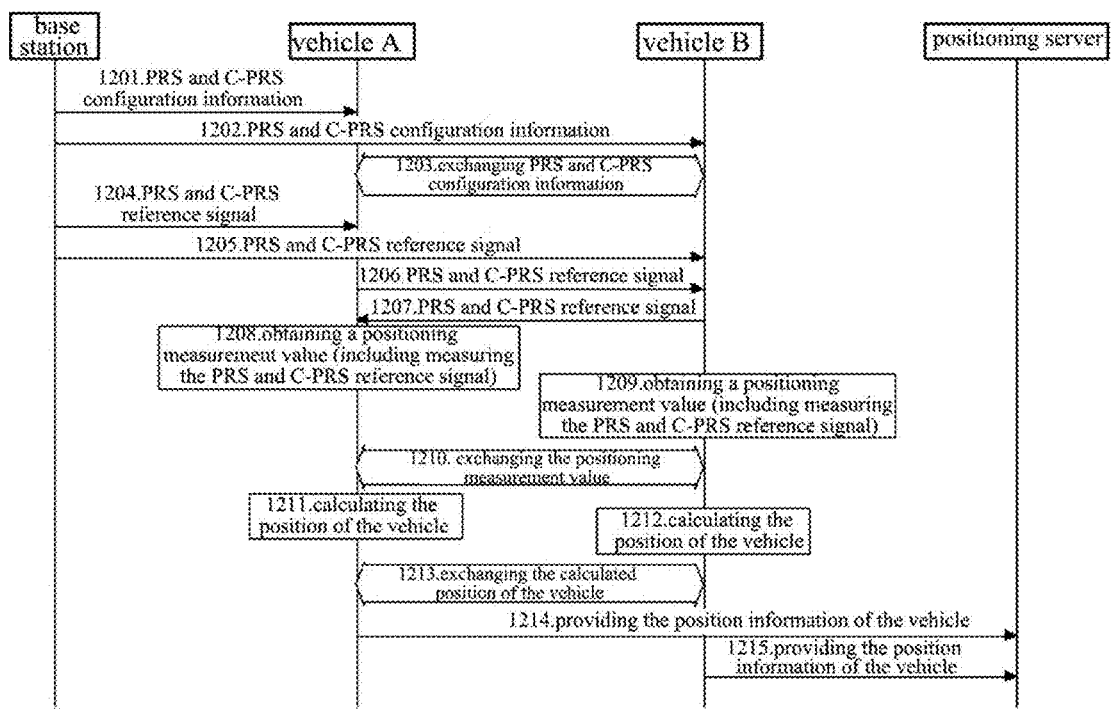
FIG. 12 is a schematic diagram of a scenario in Example 2.1 according to an embodiment of the present disclosure.
Figure 13:
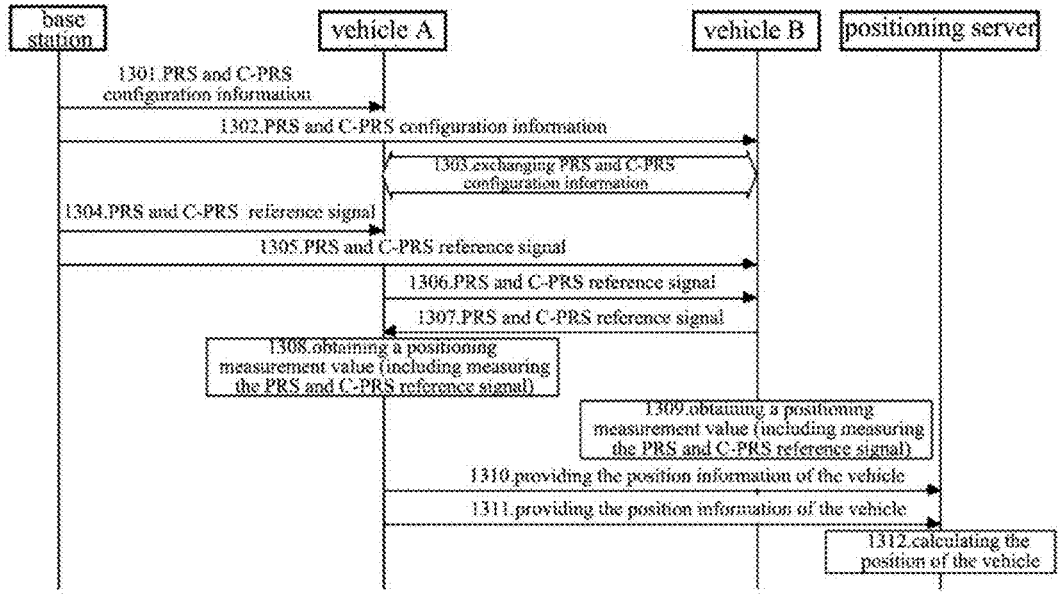
FIG. 13 is a schematic diagram of a scenario in Example 2.2 according to an embodiment of the present disclosure.

FIGS. 12 and 13 respectively show two examples that the vehicle performs positioning position calculation and the location server calculation to obtain the positioning position.

Example 2.1

As shown in FIG. 12, the vehicle performs positioning calculation by the following steps.

Step 1201: The base station sends PRS and C-PRS configuration information (including the actual position information of the base station) to the vehicle A;

Step 1202, the base station sends PRS and C-PRS configuration information (including the actual position information of the base station) to the vehicle B;

Step 1203: Vehicle A and vehicle B exchange PRS and C-PRS configuration information with each other;

Step 1204: The base station sends PRS and C-PRS reference signals to vehicle A;

Step 1205: The base station sends PRS and C-PRS reference signals to vehicle B;

Step 1206: Vehicle A sends PRS and C-PRS reference signals to vehicle B;

Step 1207: Vehicle B sends PRS and C-PRS reference signals to vehicle A;

Step 1208: Vehicle A measures the PRS and C-PRS reference signals sent by the base station and vehicle B, and measures GNSS signals at the same time, and obtains various measurement values through various positioning sensors of the vehicle A;

Step 1209: Vehicle B measures the PRS and C-PRS reference signals sent by the base station and vehicle A, measures GNSS signals at the same time, and obtains various measurement values through various positioning sensors of the vehicle B;

Step 1210: Vehicle A and vehicle B exchange the acquired measurement values with each other;

In step 1211, the vehicle A calculates the location of the vehicle (A, B) based on the measurement values obtained in steps 8 and 10. The calculation of the location of the vehicle (A, B) in step 11 may have a variety of situations. On the one hand, it depends on the specific needs of vehicle A for positioning, and on the other hand, it depends on the measured value obtained by the vehicle A. For example, vehicle A can only calculate the location of vehicle A, or it can calculate the location of vehicle B, the relative position between A and B, the relative distance between A and B, the change of the relative position between A and B, and the change of the relative position between A and B according to specific application requirements. Vehicle A should use all measured values to obtain the best positioning performance.

Step 1212: Vehicle B calculates the location of vehicle (A, B) based on the measurement values obtained in steps 9 and 10;

Step 1213: Vehicle A and vehicle B can exchange the calculated positions of the vehicles (A, B) with each other, so as to monitor the reliability of positioning with each other;

Step 1214: Vehicle A reports the position information of vehicle A and vehicle B calculated by the vehicle A to the location server;

Step 1215: Vehicle B reports the position information of vehicle A and vehicle B calculated by the vehicle B to the location server.

In Example 2.1, in addition to receiving the PRS and C-PRS signals sent by the base station, the vehicles can send PRS and C-PRS signals to each other, and provide the PRS and C-PRS configuration information to each other through the direct link (sidelink) between the vehicles. The vehicles can exchange the obtained positioning measurement values with each other. Each vehicle can estimate the position thereof through all the obtained information, including the measurement value obtained by measuring the PRS and C-PRS of the base station, the measurement value obtained by measuring the GNSS signal, the measurement value provided by the various positioning sensors of the vehicle, etc., as shown in steps 11 and 12. At the same time, the vehicle can also share the location information thereof with other vehicles. In addition, by installing a plurality of vehicle antennas, or a large antenna array, the reliability and positioning performance of the 5G NR PRS and C-PRS IoV collaborative navigation and positioning system can be further enhanced.

Example 2.2

As shown in FIG. 13, the vehicle reports the positioning measurement value to the location server, and the location server calculates the positioning position, which specifically includes the following steps.

Step 1301: The base station sends PRS and C-PRS configuration information to vehicle A;

Step 1302: The base station sends PRS and C-PRS configuration information to vehicle B;

Step 1303: Vehicle A and vehicle B exchange PRS and C-PRS configuration information with each other;

Step 1304: The base station sends PRS and C-PRS reference signals to vehicle A;

Step 1305: The base station sends PRS and C-PRS reference signals to vehicle B;

Step 1306: Vehicle A sends PRS and C-PRS reference signals to vehicle B;

Step 1307: Vehicle B sends PRS and C-PRS reference signals to vehicle A;

Step 1308: Vehicle A measures the PRS and C-PRS reference signals sent by the base station and vehicle B, measures GNSS signals at the same time, and obtains various measurement values through various positioning sensors of the vehicle A;

Step 1309: Vehicle B measures the PRS and C-PRS reference signals sent by the base station and vehicle A, measures GNSS signals at the same time, and obtains various measurement values through various positioning sensors of the vehicle B;

Step 1310: Vehicle A reports the measurement value obtained by vehicle A in step 8 to the location server;

Step 1311: Vehicle B reports the measurement value obtained by vehicle B in step 9 to the location server;

Step 1312: the location server further calculates the location of the vehicle (A, B) based on the measured values reported by the vehicles A and B in step 10 and step 11.

Example 2.3

Figure 14:
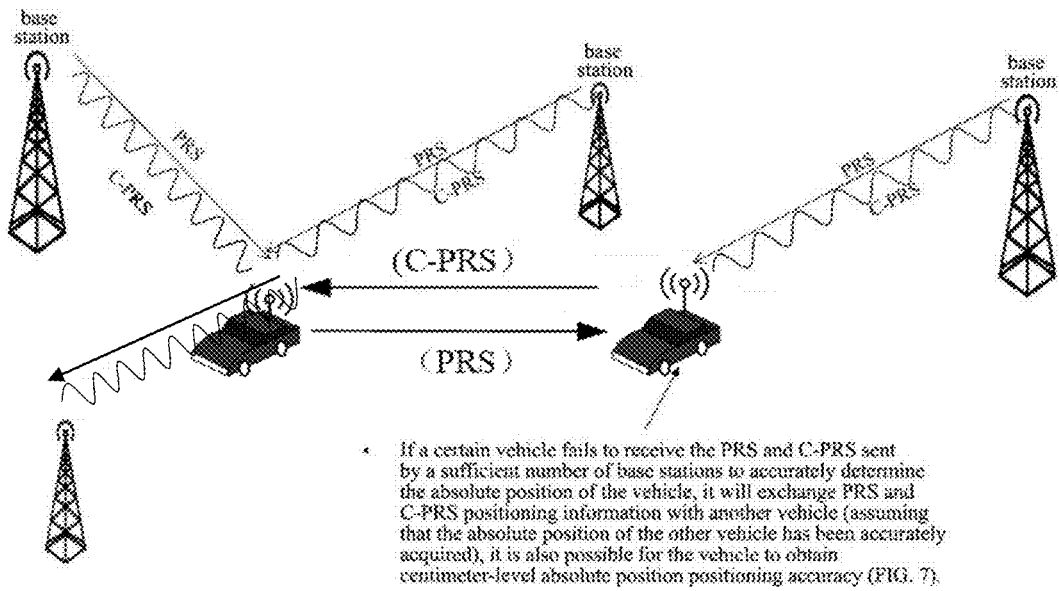
FIG. 14 is a schematic diagram of a scenario in Example 2.3 according to an embodiment of the present disclosure.

The process of this example is similar to that of example 2.1, the difference is as shown in FIG. 14.
1) If a certain vehicle B fails to receive the PRS sent by a sufficient number of base stations to determine the absolute location of the vehicle (the vehicle on the right in FIG. 14), it will exchange PRS reference signals (steps 1206 and 1207 in example 2.1) and PRS location information (step 1210 in example 2.1) with the vehicle A (the vehicle on the left in FIG. 14, and it is assumed that the absolute location of the vehicle A has been obtained through the PRS received by a sufficient number of base stations). It is also possible for the vehicle B to obtain meter-level positioning accuracy or higher relative position accuracy through cooperative positioning.
2) If a certain vehicle B fails to receive the PRS and C-PRS sent by a sufficient number of base stations to accurately determine the absolute location of the vehicle, it will exchange PRS, C-PRS reference signals (steps 1206 and 1207 in Example 2.1) and PRS and C-PRS location information (step 1210 in Example 2.1) with the other vehicles A (assuming that the absolute location of the vehicle A has been determined through PRS and C-PRS sent by a sufficient number of base stations and received by the vehicle A), it is also possible for the vehicle B to obtain centimeter-level absolute position positioning accuracy through cooperative positioning. Whether vehicle B can obtain centimeter-level absolute position positioning accuracy through cooperative positioning depends on factors such as the type, the number and the accuracy of the measurement value that may be obtained by the vehicle B.

The positioning method of the embodiment of the present disclosure is described in detail above. It can be seen that, compared with the vehicle integrated navigation and positioning system with GNSS as the core in the related art, the vehicle integrated navigation and positioning system based on the 5G NR reference signal proposed by the embodiment of the present disclosure has the advantages as follows.
1) Vehicle positioning is performed through the PRS and C-PRS sent by the 3GPP wireless communication network, thus vehicle positioning still works when the GNSS satellite signal is weak or cannot be received;
2) For the GNSS system, GNSS users generally cannot adjust GNSS configuration and signal transmission as needed. For vehicle positioning based on 5G NR PRS and C-PRS and vehicle integrated navigation and positioning systems carrying 5G NR PRS and C-PRS, operators can also adjust and configure the number, position, transmitting frequency of the sending end that sends the PRS and C-PRS signals as needed, to improve positioning performance;
3) TOA/TDOA measurement errors may be reduced by adjusting the configuration for sending PRS, thus it is easier to search for integer ambiguity in carrier phase measurement in 5G NR than to search for integer ambiguity in carrier phase measurement in GNSS;
4) In a normal working environment, the signal power at the receiving end of 5G NR is much greater than the signal power of the GNSS signal reaching the ground. Compared with GNSS, it is easier and faster to lock the carrier signal in 5G NR; and if phase unlock occurs, the phase lock can be quickly restored;
5) the large bandwidth and high data rate characteristics of the 5G NR wireless communication system are utilized to reduce the time for location information exchange and positioning measurement to a few milliseconds or less;
6) The IoV collaborative navigation and positioning system based on 5G NR PRS and C-PRS can provide higher positioning accuracy than the navigation and positioning systems in the related art. In the IoV cooperative navigation and positioning system based on 5G NR PRS and C-PRS, the vehicle accurately calculates the relative distance, the relative position, the change of the relative distance and the change of the relative location of the vehicle by measuring the PRS or C-PRS reference signal sent between the vehicles, it is not necessarily to entirely rely on the PRS or C-PRS reference signal sent by the base station. It is especially suitable for the functions of fast tracking and monitoring the movement of surrounding vehicles, predicting and avoiding traffic accidents, which are required for automatic driving of vehicles.

Based on the positioning method provided in the above embodiment, the following further provides a device for implementing the above method.

Figure 15:
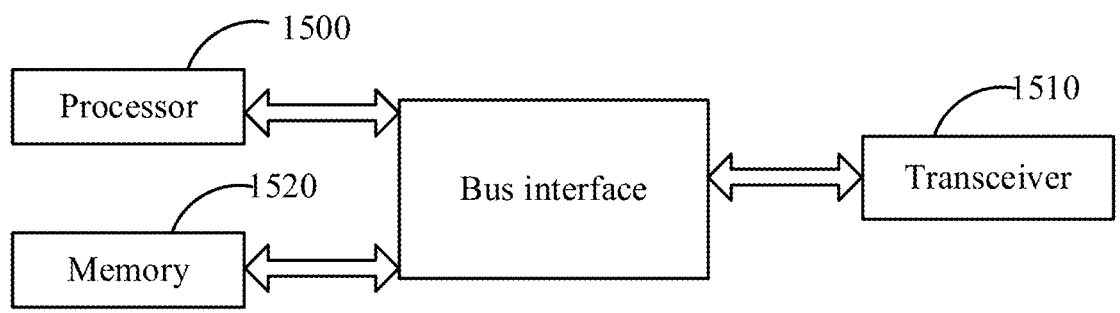
FIG. 15 is a structural diagram of a first vehicle according to an embodiment of the present disclosure.

FIG. 15 is a structural diagram of a first vehicle provided by an embodiment of the present disclosure. As shown in FIG. 15, the user terminal includes: a transceiver 1510, a memory 1520, a processor 1500, and a computer program stored on the memory and executed by the processor 1520.

The transceiver 1510 is configured to measure a positioning reference signal PRS and a carrier phase reference signal C-PRS sent by a plurality of positioning reference devices to obtain a plurality of PRS measurement results and a plurality of C-PRS measurement results, the plurality of positioning reference devices including a network side device and other vehicles.

The processor 1500 is configured to read a program in a memory, and execute the following process: perform a positioning operation according to the plurality of PRS measurement results and the plurality of C-PRS measurement results;

Wherein, the positioning operation includes: sending the plurality of PRS measurement results and the plurality of C-PRS measurement results to a location server, and receiving location information of the first vehicle determined based on the plurality of PRS measurement results and the plurality of C-PRS measurement results from the location server; or the positioning operation includes: determining, by the first vehicle, the location information of the first vehicle according to the plurality of PRS measurement results and the plurality of C-PRS measurement results.

The location information of the first vehicle includes at least one of the following information: a location of the first vehicle, a relative distance between the first vehicle and other vehicles, change information of the relative distance between the first vehicle and other vehicles, a relative location of the first vehicle with respect to other vehicles, and change information of the relative location of the first vehicle with respect to other vehicles.

Among them, the transceiver 1510 can be used to receive and send data under the control of the processor 1500.

In FIG. 15, the bus architecture may include any number of interconnected buses and bridges. Specifically, various circuits of one or more processors represented by the processor 1500 and the memory represented by the memory 1520 are linked together. The bus architecture can also link various other circuits such as peripheral devices, voltage regulators, power management circuits, etc., which are all known in the art, and therefore, no further description will be given herein. The bus interface provides the interface. The transceiver 1510 may be a plurality of elements, that is, including a transmitter and a receiver, and provide a unit for communicating with various other devices on the transmission medium.

The processor 1500 is responsible for managing the bus architecture and general processing, and the memory 1520 can store data used by the processor 1500 when performing operations.

It should be noted that the memory 1520 is not limited to being only on the user terminal, and the memory 1520 and the processor 1500 may be separated in different geographic locations.

Optionally, the processor 1500 is further configured to obtain PRS configuration information and C-PRS configuration information of the plurality of positioning reference devices, wherein both the PRS configuration information and the C-PRS configuration information include frequency configuration information and time configuration information.

The transceiver 1510 is further configured to measure the PRS sent by the plurality of positioning reference devices according to the PRS configuration information of the plurality of positioning reference devices, and measure the C-PRS sent by the plurality of positioning reference devices according to the C-PRS configuration information of the plurality of positioning reference devices.

Optionally, each positioning reference device configures a fixed frequency resource to send the C-PRS, or each positioning reference device configures a different frequency resource to send C-PRS at a different time.

Optionally, the transceiver 1510 is further configured to perform at least one of the following: exchanging the plurality of PRS measurement results and the plurality of C-PRS measurement results measured by a vehicle and a plurality of PRS measurement results and a plurality of C-PRS measurement results measured by other vehicles; exchanging location information of a vehicle and location information of other vehicles; sending the PRS and C-PRS to other vehicles; exchanging PRS configuration information and C-PRS configuration information of a vehicle and PRS configuration information and C-PRS configuration information of other vehicles.

Optionally, the transceiver 1510 is also used to measure a global navigation satellite system GNSS signal sent by the GNSS to obtain a GNSS signal measurement result.

The processor 1500 is further configured to obtain a positioning measurement results obtained by a positioning sensor set by the processor, and perform positioning operation according to the plurality of PRS measurement results, the plurality of C-PRS measurement results, the GNSS signal measurement result and the positioning measurement result.

Optionally, the PRS measurement results include: at least one of a reference signal time difference (RSTD) and a reference signal received power RSRP.

The C-PRS measurement results include: a C-PRS carrier phase (C-PRS-CP) measurement value.

Optionally, the transceiver 1510 is further configured to send a report message to the location server, where the report message includes the plurality of PRS measurement results and an information element for reporting the C-PRS measurement results. The information element includes a C-PRS measurement result of each C-PRS.

Optionally, the information element further includes: at least one of a cell identifier corresponding to each C-PRS, a C-PRS index, a reference time during measurement, and a quality indicator of the carrier measurement value.

It should be noted that the above-mentioned first vehicle in this embodiment may be the first vehicle in any implementation in the method embodiment of the present disclosure, and any implementation of the first vehicle in the method embodiment of the disclosure may be realized by the above-mentioned first vehicle in this embodiment, the same beneficial effect is achieved, which will not be repeated here.

Figure 16:
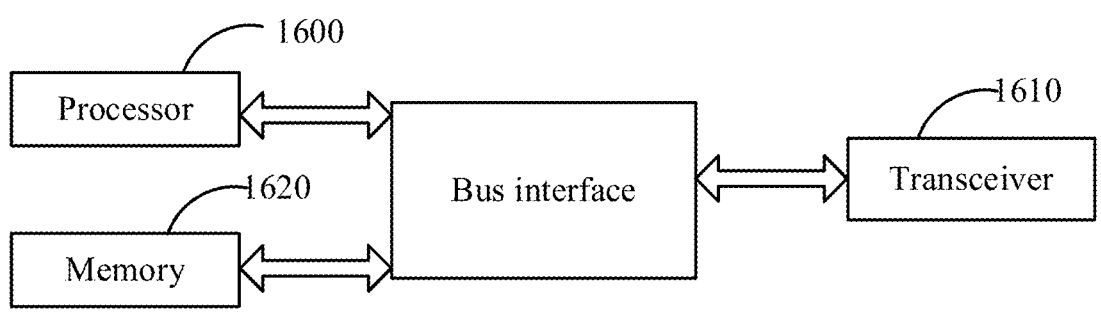
FIG. 16 is a structural diagram of a network side device according to an embodiment of the present disclosure.

Please refer to FIG. 16, which is a structural diagram of a network side device provided by an embodiment of the present disclosure. As shown in FIG. 16, the network side device includes: a transceiver 1610, a memory 1620, a processor 1600, and a computer program stored in the memory 1620 and executed by the processor, wherein:

The transceiver 1610 is configured to send PRS and the C-PRS to a first vehicle, so that the first vehicle measures the PRS to obtain the PRS measurement result, and measures the C-PRS to obtain the C-PRS measurement result.

Wherein, the PRS measurement result and the C-PRS measurement result are used for the location information of the first vehicle, and the location information of the first vehicle includes at least one of the following information: a location of the first vehicle, a relative distance between the first vehicle and other vehicles, change information of the relative distance between the first vehicle and other vehicles, a relative location of the first vehicle with respect to other vehicles, and change information of the relative location of the first vehicle with respect to other vehicles.

Among them, the transceiver 1610 can be used to receive and send data under the control of the processor 1600.

In FIG. 16, the bus architecture may include any number of interconnected buses and bridges. Specifically, various circuits of one or more processors represented by the processor 1600 and the memory represented by the memory 1620 are linked together. The bus architecture can also link various other circuits such as peripheral devices, voltage regulators, power management circuits, etc., which are all known in the art, and therefore, no further description will be given herein. The bus interface provides the interface. The transceiver 1610 may be a plurality of elements, including a transmitter and a receiver, and provide a unit for communicating with various other devices on the transmission medium.

The processor 1600 is responsible for managing the bus architecture and general processing, and the memory 1620 can store data used by the processor 1600 when performing operations.

It should be noted that the memory 1620 is not limited to being only on the network side device, and the memory 1620 and the processor 1600 may be separated in different geographic locations.

Optionally, the processor 1600 is configured to read a program in a memory and execute the following: obtaining GNSS signal quality information of the first vehicle, wherein the GNSS signal quality information includes the number of satellite signals received by the first vehicle and receiving quality of the satellite signals; and determining sending parameters of the PRS and C-PRS sent to the first vehicle according to the GNSS signal quality information of the first vehicle. The sending parameters include transmission frequency, transmission power, and transmission times per time unit. The GNSS signal quality information with a better quality corresponds to sending parameters with a lower sending level.

The transceiver 1610 is further configured to send the PRS and C-PRS to the first vehicle according to the sending parameters.

Optionally, the processor 1600 is further configured to receive a global navigation satellite system GNSS signal measurement result of the first vehicle through a transceiver; the network side device determines the GNSS signal quality information of the first vehicle according to the GNSS signal measurement result of the first vehicle; or request the GNSS signal quality information of the first vehicle from the location server through the transceiver, and receive the GNSS signal quality information of the first vehicle returned by the location server.

Optionally, different network side devices send the C-PRS to the first vehicle through different frequency resources.

Optionally, the transceiver 1610 is further configured to send the PRS configuration information and the C-PRS configuration information to the first vehicle, where both the PRS configuration information and the C-PRS configuration information include frequency configuration information and time configuration information.

Optionally, each network side device configures a fixed frequency resource to send C-PRS, or each network side device configures a different frequency resource to send C-PRS at a different time.

Optionally, the transceiver 1610 is further configured to: continuously send, by the network side device, the C-PRS to the first vehicle; or, periodically send the C-PRS to the first vehicle; or, send the C-PRS to the first vehicle on demand.

It should be noted that the above-mentioned network side device in this embodiment may be a network side device in any implementation in the method embodiment of the present disclosure, and any implementation of the network side device in the method embodiment of the disclosure may be implemented by the above-mentioned network side device in this embodiment and achieves the same beneficial effects, which will not be repeated here.

Figure 17:
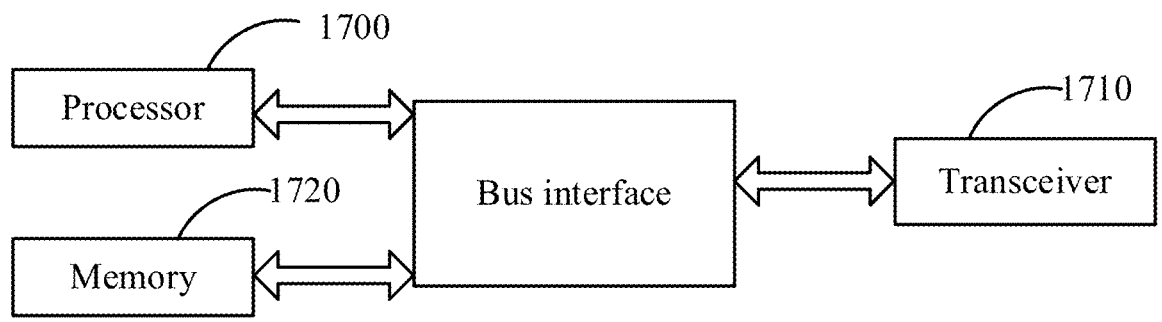
FIG. 17 is a structural diagram of a location server according to an embodiment of the present disclosure.

FIG. 17 is a structural diagram of another location server provided by an embodiment of the present disclosure. As shown in FIG. 17, the location server includes: a transceiver 1710, a memory 1720, a processor 1700 and a computer program stored in the memory and executed by the processor 1720, wherein:

The transceiver 1710 is configured to receive a positioning reference signal PRS measurement result of a PRS sent by a first vehicle to a plurality of positioning reference devices, wherein the plurality of positioning reference devices include a network side device and other vehicles, and receive a carrier phase reference signal C-PRS measurement result of the C-PRS sent by the first vehicle to the plurality of positioning reference devices.

The processor 1700 is configured to read a program in a memory and execute the following: determine location information of the first vehicle according to the plurality of PRS measurement results and the plurality of C-PRS measurement results.

Wherein, the location information of the first vehicle includes at least one of the following information: a location of the first vehicle, a relative distance between the first vehicle and other vehicles, change information of the relative distance between the first vehicle and other vehicles, a relative location of the first vehicle with respect to other vehicles, and change information of the relative location of the first vehicle with respect to other vehicles.

Among them, the transceiver 1710 can be used to receive and send data under the control of the processor 1700.

In FIG. 17, the bus architecture may include any number of interconnected buses and bridges. Specifically, various circuits of one or more processors represented by the processor 1700 and the memory represented by the memory 1720 are linked together. The bus architecture can also link various other circuits such as peripheral devices, voltage regulators, power management circuits, etc., which are all known in the art, and therefore, no further description will be given herein. The bus interface provides the interface. The transceiver 1710 may be a plurality of elements, including a transmitter and a receiver, and provide a unit for communicating with various other devices on the transmission medium.

The processor 1700 is responsible for managing the bus architecture and general processing, and the memory 1720 can store data used by the processor 1700 when performing operations.

It should be noted that the memory 1720 is not limited to being on a location server, and the memory 1720 and the processor 1700 may be separated in different geographic locations.

Optionally, the transceiver 1710 is further configured to send location information of a first vehicle to the first vehicle.

Optionally, the transceiver 1710 is also used to send the location information of the first vehicle to other vehicles.

Optionally, the transceiver 1710 is further configured to receive a GNSS signal measurement result and a positioning measurement result sent by the first vehicle, wherein the positioning measurement result is a positioning result measured by a positioning sensor of the first vehicle.

The processor 1700 is further configured to determine the location information of the first vehicle according to the plurality of PRS measurement results, the plurality of C-PRS measurement results, the GNSS signal measurement result, and the positioning measurement result.

Optionally, the transceiver 1710 is further configured to receive a request message sent by a network side device for requesting GNSS signal quality information of the first vehicle, and send the GNSS signal quality information of first vehicle to the network side device.

It should be noted that the above-mentioned location server in this embodiment may be a location server in any implementation in the method embodiment of the present disclosure, and any implementation of the location server in the method embodiment of the disclosure may be implemented by the above-mentioned location server in this embodiment and achieves the same beneficial effects, and will not be repeated here.

Figure 18:
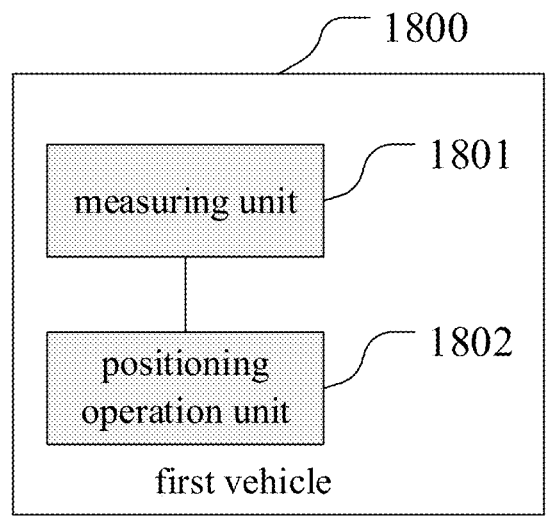
FIG. 18 is a structural diagram of another first vehicle according to an embodiment of the present disclosure.

Referring to FIG. 18, a first vehicle 1800 provided by an embodiment of the present disclosure includes: a measuring unit 1801, configured to measure a positioning reference signal PRS and a carrier phase reference signal C-PRS sent by a plurality of positioning reference devices to obtain a plurality of PRS measurement results and a plurality of C-PRS measurement results, the plurality of positioning reference devices including a network side device and other vehicles; a positioning operation unit 1802, configured to perform a positioning operation according to the plurality of PRS measurement results and the plurality of C-PRS measurement results;

Wherein, the positioning operation includes: sending the plurality of PRS measurement results and the plurality of C-PRS measurement results to a location server, and receiving location information of the first vehicle determined based on the plurality of PRS measurement results and the plurality of C-PRS measurement results from the location server; or the positioning operation includes: determining, by the first vehicle, the location information of the first vehicle according to the plurality of PRS measurement results and the plurality of C-PRS measurement results.

The location information of the first vehicle includes at least one of the following information: a location of the first vehicle, a relative distance between the first vehicle and other vehicles, change information of the relative distance between the first vehicle and other vehicles, a relative location of the first vehicle with respect to other vehicles, and change information of the relative location of the first vehicle with respect to other vehicles.

Optionally, the measurement unit 1801 is further configured to obtain PRS configuration information and C-PRS configuration information of the plurality of positioning reference devices, wherein both the PRS configuration information and the C-PRS configuration information include frequency configuration information and time configuration information; and measure the PRS sent by the plurality of positioning reference devices according to the PRS configuration information of the plurality of positioning reference devices, and measure the C-PRS sent by the plurality of positioning reference devices according to the C-PRS configuration information of the plurality of positioning reference devices.

Optionally, each positioning reference device configures a fixed frequency resource to send the C-PRS, or each positioning reference device configures a different frequency resource to send C-PRS at a different time.

Optionally, the first vehicle 1800 further includes: an interaction unit, configured to perform at least one of the following: exchanging the plurality of PRS measurement results and the plurality of C-PRS measurement results measured by a vehicle and a plurality of PRS measurement results and a plurality of C-PRS measurement results measured by other vehicles; exchanging location information of a vehicle and location information of other vehicles; sending the PRS and C-PRS to other vehicles; exchanging PRS configuration information and C-PRS configuration information of a vehicle and PRS configuration information and C-PRS configuration information of other vehicles.

Optionally, the measuring unit 1801 is further configured to measure a global navigation satellite system GNSS signal sent by the GNSS to obtain a GNSS signal measurement result.

The positioning operation unit 1802 is also used to obtain a positioning measurement results obtained by a positioning sensor set by the processor, and perform positioning operation according to the plurality of PRS measurement results, the plurality of C-PRS measurement results, the GNSS signal measurement result and the positioning measurement result.

Optionally, the PRS measurement results include: at least one of a reference signal time difference (RSTD) and a reference signal received power RSRP.

The C-PRS measurement results include: a C-PRS carrier phase (C-PRS-CP) measurement value.

Optionally, the interaction unit is further configured to send a report message to the location server, where the report message includes the plurality of PRS measurement results and an information element for reporting the C-PRS measurement results. The information element includes a C-PRS measurement result of each C-PRS.

Optionally, the information element further includes: at least one of a cell identifier corresponding to each C-PRS, a C-PRS index, a reference time during measurement, and a quality indicator of the carrier measurement value.

Figure 19:
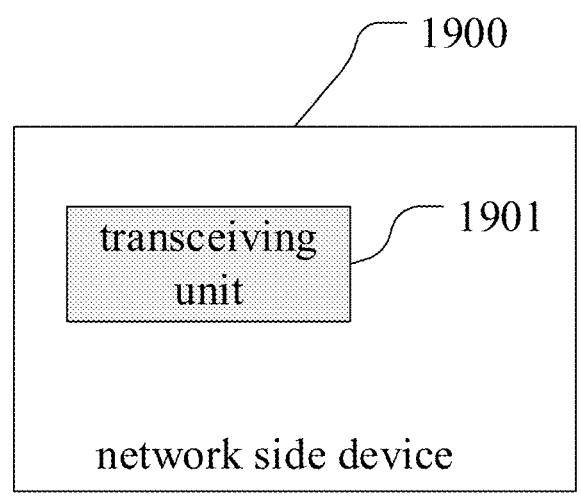
FIG. 19 is a structural diagram of another network side device according to an embodiment of the present disclosure.

Referring to FIG. 19, another network side device 1900 provided by an embodiment of the present disclosure includes: a transceiving unit 1901, configured to send PRS and the C-PRS to a first vehicle, so that the first vehicle measures the PRS to obtain the PRS measurement result, and measures the C-PRS to obtain the C-PRS measurement result.

Wherein, the PRS measurement result and the C-PRS measurement result are used for the location information of the first vehicle, and the location information of the first vehicle includes at least one of the following information: a location of the first vehicle, a relative distance between the first vehicle and other vehicles, change information of the relative distance between the first vehicle and other vehicles, a relative location of the first vehicle with respect to other vehicles, and change information of the relative location of the first vehicle with respect to other vehicles.

Optionally, the network side device 1900 further includes: a parameter determination unit, configured to obtain GNSS signal quality information of the first vehicle, wherein the GNSS signal quality information includes the number of satellite signals received by the first vehicle and receiving quality of the satellite signals; and determine sending parameters of the PRS and C-PRS sent to the first vehicle according to the GNSS signal quality information of the first vehicle. The sending parameters include transmission frequency, transmission power, and transmission times per time unit. The GNSS signal quality information with a better quality corresponds to sending parameters with a lower sending level.

The transceiver unit 1901 is further configured to send the PRS and C-PRS to the first vehicle according to the sending parameters.

Optionally, the transceiver unit 1901 is further configured to receive a global navigation satellite system GNSS signal measurement result of the first vehicle through a transceiver; the network side device determines the GNSS signal quality information of the first vehicle according to the GNSS signal measurement result of the first vehicle; or request the GNSS signal quality information of the first vehicle from the location server through the transceiver, and receive the GNSS signal quality information of the first vehicle returned by the location server.

Optionally, different network side devices send the C-PRS to the first vehicle through different frequency resources.

Optionally, the transceiver unit 1901 is further configured to send the PRS configuration information and the C-PRS configuration information to the first vehicle, where both the PRS configuration information and the C-PRS configuration information include frequency configuration information and time configuration information.

Optionally, each network side device configures a fixed frequency resource to send C-PRS, or each network side device configures a different frequency resource to send C-PRS at a different time.

Optionally, the transceiving unit 1901 is further configured to: continuously send, by the network side device, the C-PRS to the first vehicle; or, periodically send the C-PRS to the first vehicle; or, send the C-PRS to the first vehicle on demand.

Figure 20:
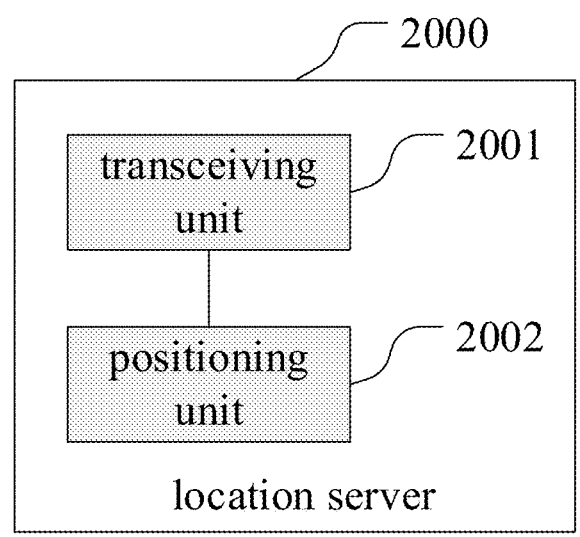
FIG. 20 is a structural diagram of another location server according to an embodiment of the present disclosure.

Referring to FIG. 20, a location server 2000 provided by an embodiment of the present disclosure includes: a transceiving unit 2001, configured to receive a positioning reference signal PRS measurement result of a PRS sent by a first vehicle to a plurality of positioning reference devices, wherein the plurality of positioning reference devices include a network side device and other vehicles, and receive a carrier phase reference signal C-PRS measurement result of the C-PRS sent by the first vehicle to the plurality of positioning reference devices.

The positioning unit 2002 is configured to determine location information of the first vehicle according to the plurality of PRS measurement results and the plurality of C-PRS measurement results.

Wherein, the location information of the first vehicle includes at least one of the following information: a location of the first vehicle, a relative distance between the first vehicle and other vehicles, change information of the relative distance between the first vehicle and other vehicles, a relative location of the first vehicle with respect to other vehicles, and change information of the relative location of the first vehicle with respect to other vehicles.

Optionally, the transceiver 2001 is further configured to send location information of a first vehicle to the first vehicle.

Optionally, the transceiver 2001 is further configured to send the location information of the first vehicle to other vehicles.

Optionally, the transceiver 2001 is further configured to receive a GNSS signal measurement result and a positioning measurement result sent by the first vehicle, wherein the positioning measurement result is the positioning result measured by a positioning sensor of the first vehicle.

The processor 2001 is further configured to determine the location information of the first vehicle according to the plurality of PRS measurement results, the plurality of C-PRS measurement results, the GNSS signal measurement result, and the positioning measurement result.

Optionally, the transceiver 2001 is further configured to receive a request message sent by a network side device for requesting GNSS signal quality information of the first vehicle, and send the GNSS signal quality information of the first vehicle to the network side device.

The embodiment of the present disclosure also provides a computer-readable storage medium on which a computer program is stored. When the program is executed by a processor, the steps in the positioning method on the user terminal side provided by the embodiments of the present disclosure are implemented, or when the program is executed by a processor, the steps in the positioning method on the positioning reference device side are implemented, or when the program is executed by the processor, the steps in the positioning method on the location server side provided in the embodiments of the present disclosure are implemented.

In the several embodiments provided in this disclosure, it should be understood that the method and device can be implemented in other ways. For example, the device embodiments described above are only illustrative. For example, the division of the units is only a logical function division, and there may be other divisions in actual implementation, for example, multiple units or components may be combined or can be integrated into another system, or some elements can be ignored or not implemented. In addition, the displayed or discussed mutual coupling or direct coupling or communication connection may be indirect coupling or communication connection through some interfaces, devices or units, and may be in electrical, mechanical or other forms.

In addition, the functional units in the various embodiments of the present disclosure may be integrated into one processing unit, or each unit may be separately physically included, or two or more units may be integrated into one unit. The integrated unit may be implemented in the form of hardware, or in the form of hardware plus software functional units.

The integrated unit implemented in the form of a software functional unit may be stored in a computer readable storage medium. The software functional unit is stored in a storage medium, and includes several instructions to enable a computer device (which may be a personal computer, a server, or a network device, etc.) to execute some steps of the methods in the various embodiments of the present disclosure. The storage media include: U disk, mobile hard disk, read-only memory (ROM), random access memory (RAM), magnetic disks or optical disks, etc., which can store program codes.

Those skilled in the art may be aware that the units and algorithm steps described in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered as going beyond the scope of the present disclosure.

Those skilled in the art can clearly understand that, for the convenience and conciseness of description, the specific working process of the above-described system, device, and unit can refer to the corresponding process in the method embodiment, which is not repeated here.

The units described as separate components may or may not be physically separated, and the components displayed as units may or may not be physical units, that is, they may be located in one place, or they may be distributed on multiple network units. Some or all of the units may be selected according to actual needs to achieve the objective of the solutions.

If the function is implemented in the form of a software functional unit and sold or used as an independent product, it can be stored in a computer readable storage medium. Based on this understanding, the technical solution of the present disclosure essentially or the part that contributes to the related technology or the part of the technical solution can be embodied in the form of a software product, and the computer software product is stored in a storage medium, including several instruction that are used to make a computer device (which may be a personal computer, a server, or a network device, etc.) execute all or part of the steps of the methods described in the various embodiments of the present disclosure. The storage medium include: U disk, mobile hard disk, ROM, RAM, magnetic disk or optical disk and other media that can store program codes.

Those skilled in the art can understand that all or part of the processes in the embodiment methods can be implemented by controlling the relevant hardware through a computer program. The program can be stored in a computer readable storage medium. When being executed, the program may include the steps of the method embodiments. Wherein, the storage medium may be a magnetic disk, an optical disc, a read-only memory (ROM), or a random access memory (RAM), etc.

It can be understood that the embodiments described in the present disclosure can be implemented by hardware, software, firmware, middleware, microcode, or a combination thereof. For hardware implementation, the processing unit can be implemented in one or more application specific integrated circuits (ASIC), digital signal processor (DSP), digital signal processing device (DSP Device, DSPD), programmable Logic Device (PLD), Field-Programmable Gate Array (FPGA), general-purpose processors, controllers, microcontrollers, microprocessors, and other electronic units for performing the functions described in this disclosure or the combination thereof.

For software implementation, the technology described in the embodiments of the present disclosure can be implemented through modules (for example, procedures, functions, etc.) that perform the functions described in the embodiments of the present disclosure. The software codes can be stored in the memory and executed by the processor. The memory can be implemented within the processor or external to the processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A vehicle positioning method, comprising:
   measuring, by a first vehicle, a positioning reference signal (PRS) and a carrier phase reference signal (C-PRS) sent by a plurality of positioning reference devices, to obtain a plurality of PRS measurement results and a plurality of C-PRS measurement results, the plurality of positioning reference devices including a network side device and other vehicles;
   performing, by the first vehicle, a positioning operation according to the plurality of PRS measurement results and the plurality of C-PRS measurement results;
   wherein the positioning operation includes: sending the plurality of PRS measurement results and the plurality of C-PRS measurement results to a location server, and receiving location information of the first vehicle determined based on the plurality of PRS measurement results and the plurality of C-PRS measurement results from the location server; or
   the positioning operation includes: determining, by the first vehicle, the location information of the first vehicle according to the plurality of PRS measurement results and the plurality of C-PRS measurement results;
   the location information of the first vehicle includes at least one of the following information: a location of the first vehicle, a relative distance between the first vehicle and the other vehicles, change information of the relative distance between the first vehicle and the other vehicles, a relative location of the first vehicle with respect to the other vehicles, and change information of the relative location of the first vehicle with respect to the other vehicles.

2. The method according to claim 1, further comprising:
   obtaining, by the first vehicle, PRS configuration information and C-PRS configuration information of the plurality of positioning reference devices, wherein both the PRS configuration information and the C-PRS configuration information include frequency configuration information and time configuration information;
   the step of measuring a positioning reference signal PRS and a carrier phase reference signal C-PRS sent by a plurality of positioning reference devices includes:
   measuring, by the first vehicle, the PRS sent by the plurality of positioning reference devices according to the PRS configuration information of the plurality of positioning reference devices, and measuring the C-PRS sent by the plurality of positioning reference devices according to the C-PRS configuration information of the plurality of positioning reference devices.

3. The method according to claim 1, wherein each positioning reference device configures a fixed frequency resource to send the C-PRS, or each positioning reference device configures a different frequency resource to send C-PRS at a different time.

4. The method according to claim 1, further comprising at least one of the following:
   exchanging, by the first vehicle and the other vehicles, the plurality of PRS measurement results and the plurality of C-PRS measurement results measured by the first vehicle and a plurality of PRS measurement results and a plurality of C-PRS measurement results measured by the other vehicles;
   exchanging, by the first vehicle and the other vehicles, the location information of the first vehicle and location information of the other vehicles;
   sending, by the first vehicle, the PRS and the C-PRS to the other vehicles; and
   exchanging, by the first vehicle and the other vehicles, the PRS configuration information and the C-PRS configuration information of the first vehicle and PRS configuration information and C-PRS configuration information of the other vehicles.

5. The method according to claim 1, further comprising:
   measuring, by the first vehicle, a global navigation satellite system (GNSS) signal sent by the GNSS to obtain a GNSS signal measurement result;
   obtaining, by the first vehicle, a positioning measurement results measured by a positioning sensor set by the first vehicle;
   the step of performing a positioning operation according to the plurality of PRS measurement results and the plurality of C-PRS measurement results includes:
   performing, by the first vehicle, an positioning operation according to the plurality of PRS measurement results, the plurality of C-PRS measurement results, the GNSS signal measurement result and the positioning measurement result.

6. The method according to claim 1, wherein the PRS measurement results include: at least one of a reference signal time difference (RSTD) and a reference signal received power (RSRP);
the C-PRS measurement results include: a C-PRS carrier phase (C-PRS-CP) measurement value.

7. The method according to claim 1, wherein the sending the plurality of PRS measurement results and the plurality of C-PRS measurement results to the location server comprises:
sending a report message to the location server, wherein the report message includes the plurality of PRS measurement results and an information element for reporting the C-PRS measurement results, wherein the information element includes a C-PRS measurement result of each C-PRS.

8. The method according to claim 7, wherein the information element further includes: at least one of a cell identifier corresponding to each C-PRS, a C-PRS index, a reference time during measurement, and a quality indicator of the carrier measurement value.

9. A first vehicle, comprising: a transceiver, a memory, a processor, and a computer program stored on the memory and executed by the processor to implement the vehicle positioning method according to claim 1.

10. A vehicle positioning method, comprising:
sending, by a network side device, a positioning reference signal PRS and a carrier phase reference signal C-PRS to a first vehicle, so that the first vehicle measures the PRS to obtain a PRS measurement result, and measures the C-PRS to obtain a C-PRS measurement result;
wherein the PRS measurement result and the C-PRS measurement result are used for location information of the first vehicle, and the location information of the first vehicle includes at least one of the following information: a location of the first vehicle, a relative distance between the first vehicle and other vehicles, change information of the relative distance between the first vehicle and the other vehicles, a relative location of the first vehicle with respect to the other vehicles, and change information of the relative location of the first vehicle with respect to the other vehicles.

11. The method according to claim 10, wherein, before sending PRS or C-PRS, the method further comprises:
obtaining, by the network side device, global navigation satellite system GNSS signal quality information of the first vehicle, wherein the GNSS signal quality information includes a quantity of satellite signals received by the first vehicle and a receiving quality of the satellite signals; and
determining, by the network side device, sending parameters of the PRS and the C-PRS sent to the first vehicle according to the GNSS signal quality information of the first vehicle, wherein the sending parameters include transmission frequency, transmission power, and transmission times per time unit, GNSS signal quality information with a better quality corresponds to sending parameters with a lower sending level,
wherein the acquiring GNSS signal quality information of the first vehicle comprises:
receiving, by the network side device, a GNSS signal measurement result of the first vehicle; wherein the network side device determines GNSS signal quality information of the first vehicle according to the GNSS signal measurement result of the first vehicle; or
requesting, by the network side device, the GNSS signal quality information of the first vehicle from the location server, and receiving the GNSS signal quality information of the first vehicle returned by the location server.

12. The method according to claim 10, wherein different network side devices send the C-PRS to the first vehicle through different frequency resources,
the method further comprises:
sending, by the network side device, PRS configuration information and C-PRS configuration information to the first vehicle, wherein both the PRS configuration information and the C-PRS configuration information include frequency configuration information and time configuration information.

13. The method according to claim 10, wherein each network side device configures a fixed frequency resource to send the C-PRS, or each network side device configures a different frequency resource to send C-PRS at a different time.

14. The method according to claim 10, wherein the sending the C-PRS comprises:
continuously sending, by the network side device, the C-PRS to the first vehicle; or
periodically sending, by the network side device, the C-PRS to the first vehicle; or
sending, by the network side device, the C-PRS to the first vehicle on demand.

15. A network side device, comprising: a transceiver, a memory, a processor, and a computer program stored on the memory and executed by the processor to implement the vehicle positioning method according to claim 10.

16. A vehicle positioning method, comprising:
receiving, by a location server, a positioning reference signal PRS measurement result of a PRS sent by a first vehicle to a plurality of positioning reference devices, wherein the plurality of positioning reference devices include a network side device and other vehicles;
receiving, by the location server, a carrier phase reference signal C-PRS measurement result of a C-PRS sent by the first vehicle to the plurality of positioning reference devices;
determining, by the location server, location information of the first vehicle according to the plurality of PRS measurement results and the plurality of C-PRS measurement results;
wherein the location information of the first vehicle includes at least one of the following information: a location of the first vehicle, a relative distance between the first vehicle and the other vehicles, change information of the relative distance between the first vehicle and the other vehicles, a relative location of the first vehicle with respect to the other vehicles, and change information of the relative location of the first vehicle with respect to the other vehicles.

17. The method according to claim 16, further comprising:
sending, by the location server, the location information of the first vehicle to the first vehicle.

18. The method according to claim 16, further comprising:
sending, by the location server, the location information of the first vehicle to the other vehicles.

19. The method according to claim 16, further comprising:
- receiving, by the location server, a global navigation satellite system GNSS signal measurement result and a positioning measurement result sent by the first vehicle, wherein the positioning measurement result is a positioning result measured by a positioning sensor of the first vehicle;
- the step of determining the location information of the first vehicle according to the plurality of PRS measurement results and the plurality of C-PRS measurement results includes:
- determining, by the location server, the location information of the first vehicle according to the plurality of PRS measurement results, the plurality of C-PRS measurement results, the GNSS signal measurement result, and the positioning measurement result,
- the method further comprises:
- receiving, by the positioning server, a request message sent by a network side device for requesting GNSS signal quality information of the first vehicle, and sending the GNSS signal quality information of first vehicle to the network side device.

20. A location server, comprising: a transceiver, a memory, a processor, and a computer program stored on the memory and executed by the processor to implement the vehicle positioning method according to claim 16.

* * * * *